(12) United States Patent
Dedek

(10) Patent No.: US 11,792,546 B2
(45) Date of Patent: Oct. 17, 2023

(54) IMAGER HAVING DIGITIZING ERROR COMPENSATION

(71) Applicant: Arnold & Richter Cine Technik GmbH & Co. Betriebs KG, Munich (DE)

(72) Inventor: Nicolas Dedek, Munich (DE)

(73) Assignee: Arnold & Richter Cine Technik Gmbh & Co. Betriebs KG, Munich (DE)

( * ) Notice: Subject to any disclaimer, the term of this patent is extended or adjusted under 35 U.S.C. 154(b) by 0 days.

(21) Appl. No.: 17/500,488

(22) Filed: Oct. 13, 2021

(65) Prior Publication Data

US 2022/0124269 A1   Apr. 21, 2022

(30) Foreign Application Priority Data

Oct. 15, 2020 (DE) .................... 10 2020 127 129.8

(51) Int. Cl.
 *H04N 25/75* (2023.01)
 *H04N 25/71* (2023.01)
 (Continued)

(52) U.S. Cl.
 CPC ........... *H04N 25/75* (2023.01); *H04N 25/745* (2023.01); *H04N 25/767* (2023.01); *H04N 25/771* (2023.01); *H04N 25/772* (2023.01)

(58) Field of Classification Search
 CPC .. H04N 5/378; H04N 5/3742; H04N 5/37452; H04N 5/37455; H04N 5/3765;
 (Continued)

(56) References Cited

U.S. PATENT DOCUMENTS

2005/0046715 A1* 3/2005 Lim ..................... H04N 5/3532
358/463
2010/0110251 A1   5/2010 Cieslinksi
(Continued)

FOREIGN PATENT DOCUMENTS

DE   10 2008 052 916 A1   4/2010
DE   10 2009 019 034 A1   10/2010
(Continued)

OTHER PUBLICATIONS

German Search Report in related German Patent Application No. 10 2020 127 129.8, dated Jun. 30, 2021 (eleven pages).
(Continued)

*Primary Examiner* — Nhan T Tran
(74) *Attorney, Agent, or Firm* — KILPATRICK TOWNSEND & STOCKTON, LLP

(57) ABSTRACT

An imager comprises an image sensor that has a plurality of pixels arranged in rows and columns, wherein each pixel comprises a light-sensitive detector element for generating electric charge from light incident during an exposure, and a reset device to reset charge present in the pixel to a reference value. The imager has a control device that is configured to couple a respective pixel to the associated column line in order to successively output a reference voltage signal, which corresponds to the reference value, and an image voltage signal, which corresponds to the electric charge generated, at the associated column line. The imager has a first analog-to-digital converter and a second analog-to-digital converter. The control device is configured to apply the reference voltage signal to a signal input of the first analog-to-digital converter and to simultaneously apply the image voltage signal to a signal input of the second analog-to-digital converter.

24 Claims, 11 Drawing Sheets

Figure 1A:
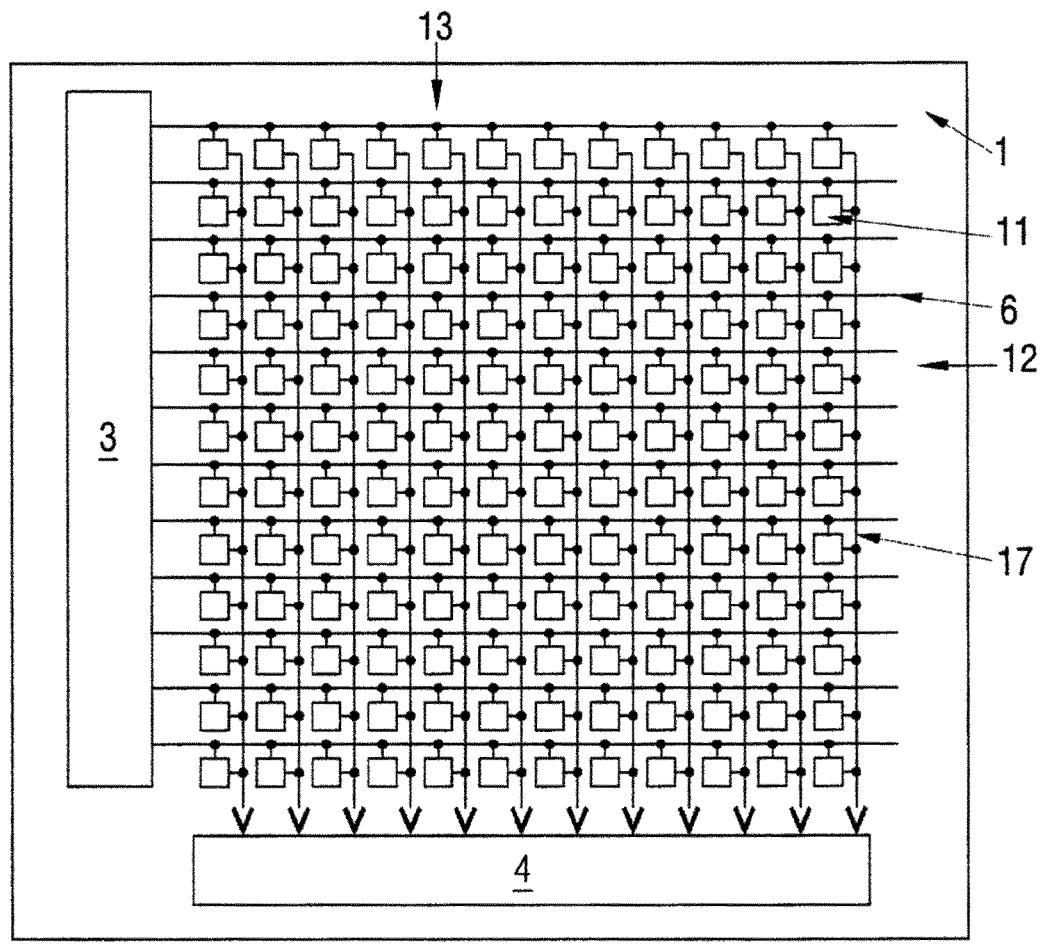

(51) Int. Cl.
*H04N 25/767* (2023.01)
*H04N 25/771* (2023.01)
*H04N 25/772* (2023.01)

(58) Field of Classification Search
CPC ...... H04N 5/341; H04N 5/3575; H04N 5/374; H04N 5/345
See application file for complete search history.

(56) References Cited

U.S. PATENT DOCUMENTS

| | | |
|---|---|---|
| 2011/0101204 A1 | 5/2011 | Cieslinski |
| 2011/0205100 A1* | 8/2011 | Bogaerts .............. H04N 5/3743 341/169 |
| 2012/0062773 A1 | 3/2012 | Cieslinski |
| 2013/0146749 A1* | 6/2013 | Cieslinski ............. H01L 27/148 250/208.1 |
| 2014/0313382 A1* | 10/2014 | Jang ....................... H04N 5/365 348/302 |
| 2014/0313385 A1* | 10/2014 | Sato ....................... H04N 5/378 348/302 |
| 2014/0375852 A1* | 12/2014 | Ogino ............... H01L 27/14627 438/69 |
| 2015/0049232 A1 | 2/2015 | Kim et al. |
| 2015/0304519 A1 | 10/2015 | Kim et al. |
| 2016/0198114 A1 | 7/2016 | Zhang et al. |

FOREIGN PATENT DOCUMENTS

| | | |
|---|---|---|
| DE | 10 2010 035 811 A1 | 4/2012 |
| DE | 10 2011 120 099 A1 | 6/2013 |
| EP | 2 037 668 B1 | 1/2019 |
| EP | 3 579 549 B1 | 5/2021 |

OTHER PUBLICATIONS

European Search Report dated Feb. 25, 2022 from European Patent Application No. 21202499.6 (nine pages).

* cited by examiner

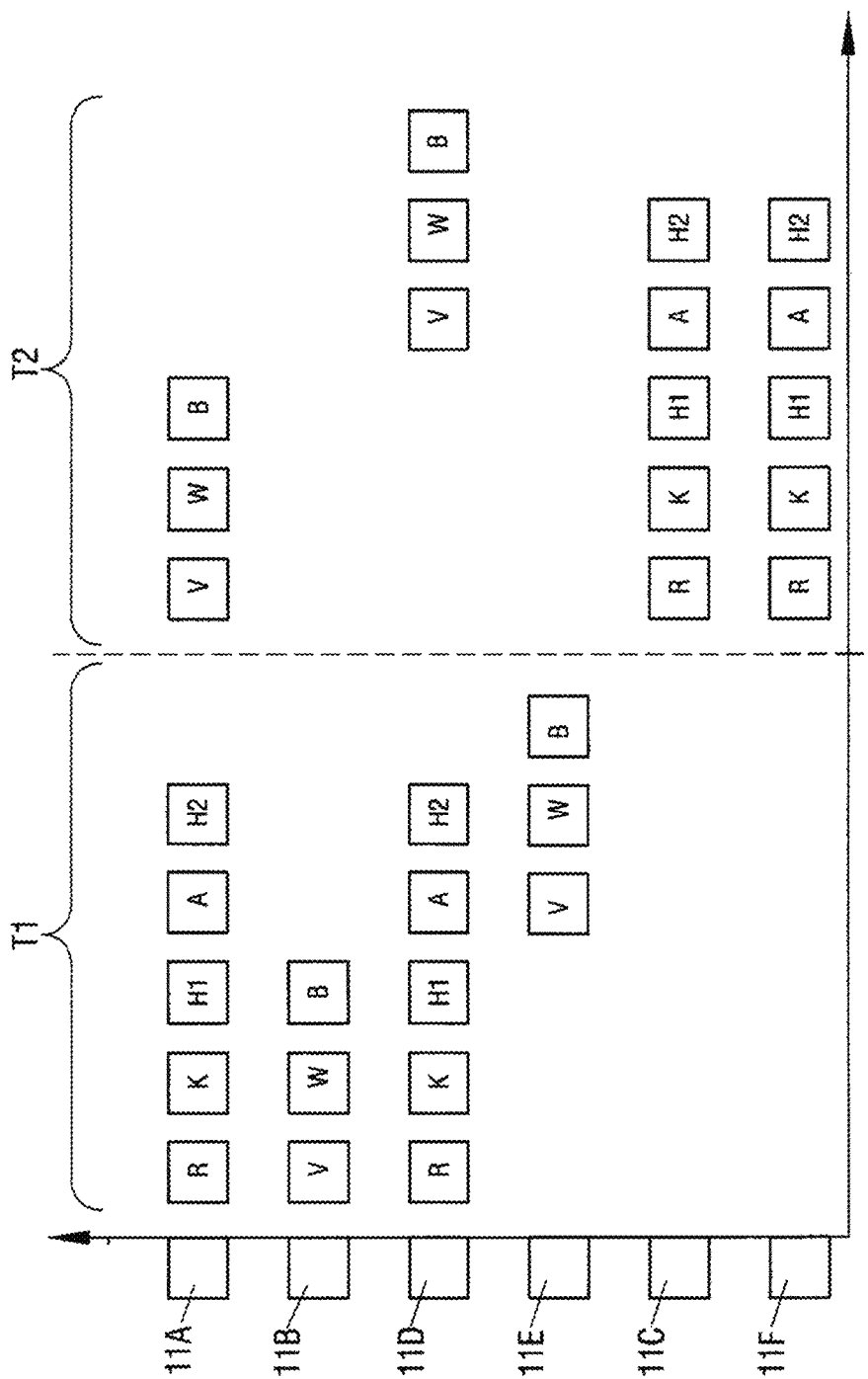

IMAGER HAVING DIGITIZING ERROR COMPENSATION

This application claims priority to German Patent Application 10 2020 127 129.8 filed on Oct. 15, 2020, which is incorporated by reference.

The invention relates to an imager comprising an image sensor, in particular a CMOS image sensor, for electronic cameras that has a plurality of pixels arranged in rows and columns, wherein at least one common column line is associated with a plurality of pixels in a column, and wherein each pixel comprises a light-sensitive detector element, which is configured to generate electric charge from light incident during an exposure, and a reset device that is configured to reset charge present in the pixel to a reference value.

Electronic cameras are, for example, used as motion picture cameras to record motion picture sequences that are later shown in the cinema. In this respect, it is important that these cameras have a high image quality. The recorded images are in particular also changed in brightness, contrast, and color during post-production and the end product—the processed motion picture sequence or the film—is projected onto a large screen in the cinema.

Electronic cameras typically use image sensors composed of silicon in CMOS or CCD technology. In such image sensors, the pixels form an image field and they are arranged in rows and columns. The pixels may be provided with a color filter array (CFA) to have a different spectral sensitivity. In this respect, each pixel comprises at least one light-sensitive detector element to generate electric charge from light incident during an exposure. The charge generated may be read out via a readout node of the pixel and may then be digitized to be able to determine and output a digital value proportional to the charge generated, wherein the respective digital values of the plurality of pixels form a digital representation of the image recorded. For example, the pixels may for this purpose have a converter transistor that may form an impedance converter and may generate a voltage signal at its signal output in dependence on an amount of charge present at its input.

The column lines of the image sensor may further be connected to a respective column amplifier to amplify the voltage signals of the pixels that are successively switched to the associated column line. The pixels of the image sensor may, for example, be addressed row-wise and the signals of the pixels may be conducted to the column amplifiers at the margin of the image field, and from there to the output, may be digitized, and may optionally be offset with calibration data.

Such a row-wise readout of the pixels of the image sensor enables a fast and efficient digitizing of the signals recorded during an exposure. To further accelerate this digitizing of the signals or readout of the image sensor, DE 10 2011 120 099 A1 discloses an image sensor in which a plurality of column lines are associated with each column of pixels, wherein a respective switching device couples one of the column lines to a pre-charge circuit and another one of the column lines to a column readout circuit in a first switching state. The pre-charge circuit may in this respect be provided to reset the coupled column line to a reference potential such that the time during the readout of a pixel via the one column line may be used to prepare the other column line for the readout of a subsequent pixel.

The respective pixel may further comprise a reset device to selectively couple the readout node to a reset potential and thereby to reset charge present in the pixel to a reference value. In this respect, an image sensor is, for example, known from DE 10 2010 035 811 A1 in which a difference is formed between an image voltage signal, which is proportional to the electric charge generated at the detector element, and a reference voltage signal, which is proportional to the reference value, in accordance with the principle of correlated double sampling. This in particular makes it possible to compensate an offset arising due to a noise of the pixel and thereby to increase the accuracy of the digital values output.

The correlated double sampling may, for example, take place as an analogous correlated double sampling, wherein the analog reference voltage signal is subtracted from the analog image voltage signal to compensate the noise of the image sensor. For this purpose, the reference voltage signal may, for example, be applied to a negative input of a column amplifier and the image voltage signal may be applied to a positive input of the column amplifier such that a voltage corresponding to the difference of the two voltage signals is applied to the output of the column amplifier. The voltage signal already corrected in such a manner may then be converted into a digital value by means of an analog-to-digital converter.

Alternatively to such an analogous correlated double sampling, the reference voltage signal and the image voltage signal may also first be converted into respective digital signals to be able to compensate a noise of the respective pixel by a subsequent offsetting of the digital signals in the course of a digital correlated double sampling. In this respect, the reference voltage signal, which has to be temporarily held in a memory during an analogous correlated double sampling, may in particular be converted immediately such that the time required for reading out the image voltage signal may already be used for converting the reference voltage signal.

While errors or offsets caused by noise of the image sensor or by different reference values of individual pixels may be compensated by means of the correlated double sampling, the problem arises that errors or fluctuations may also occur during the digitizing of the signals. In an analogous correlated double sampling, such errors may subsequently at most be approximately corrected since only one digitized value containing an error is output that does not provide any information on the magnitude of the error. In a digital correlated double sampling, two digitized values containing errors are subtracted from one another, wherein these errors may differ and may likewise not be precisely determined such that the error of the output value may only be estimated or corrected with difficulty. On a row-wise readout of the image sensor, such errors may also have an effect on the entire row and may produce a structural deviation in the recorded image along this row to which the human eye reacts particularly sensitively.

It is therefore an object of the invention to provide an imager for efficiently converting analog signals of an image sensor into digital output signals, by means of which imager digital output signals corresponding as precisely as possible to the charge generated during an image recording may be determined and in particular errors occurring during the digitizing may be compensated.

This object is satisfied by an imager having the features of claim 1.

The imager has a control device that is configured to couple a respective pixel to the associated column line in order to successively output a reference voltage signal that corresponds to the reference value and an image voltage signal that corresponds to the electric charge generated at the column line. In this respect, the imager has at least one converter unit that has a first analog-to-digital converter and a second analog-to-digital converter, wherein the control device is configured to apply (i.e. feed or transfer) the reference voltage signal of the respective pixel to a signal input of the first analog-to-digital converter for conversion into a digital reference signal value and to simultaneously apply the image voltage signal of the respective pixel to a signal input of the second analog-to-digital converter for conversion into a digital image signal value.

To read out a pixel or to determine a digital value that is proportional to the charge generated at the light-sensitive detector element during an exposure, the charge present in the pixel may therefore first be reset to a reference value. This reference value may then be output as a corresponding reference voltage signal by coupling the pixel to the column line. Thereupon, the charge generated at the detector element during the exposure may be output as an image voltage signal by means of the column line. In this respect, the reference voltage signal and the image voltage signal form respective analog signals that may, for example, be buffered in respective memories, in particular capacitors, to be able to be simultaneously applied to the signal inputs of the analog-to-digital converters. The reference voltage signal may in particular be held in a memory while the exposure still takes place (charge generation in the detector element) and/or while the image voltage signal is generated or is output via the column line. The image voltage signal may likewise be held in a memory or may in particular also be directly applied to the signal input of the second analog-to-digital converter.

Since the control device is configured to apply the reference voltage signal and the image voltage signal of the respective pixel simultaneously (i.e. at the same time) to the respective signal inputs of the first analog-to-digital converter and the second analog-to-digital converter, the conversion of these two analog signals associated with the pixel may in particular also take place simultaneously in order to determine the reference signal value and the image signal value in a common digitizing process. In this respect, the first analog-to-digital converter and the second analog-to-digital converter may be operated in a synchronized manner such that the digital reference signal value and the digital image signal value may contain the same errors that are in particular based on the digitizing of the analog signals. These errors may thus actually be eliminated by a subsequently performed digital correlated double sampling, in which the reference signal value is subtracted from the image signal value, such that both a noise of the pixel and errors occurring due to the digitizing of the voltage signals are compensated in the digital value that is ultimately output. In particular errors that lead to an offset of the digital values may be precisely compensated by subtracting the reference signal value from the image signal value.

The simultaneous application of the analog signals of a respective pixel, that is the reference voltage signal and the image voltage signal, to a respective analog-to-digital converter thus enables a compensation of errors occurring during the digitizing to replace approximation methods required in a conventional correlated double sampling and to increase the accuracy of the output digital value. In an analogous correlated double sampling, in which the analog reference voltage signal is already subtracted from the analog image voltage signal and only an analog signal to be converted is available, the error occurring on the digitizing may be approximately determined by reading out dark or unexposed rows. In this respect, a mean value of the errors occurring during the digitizing is determined for these dark rows and is subtracted from the digitized signal of the pixel to compensate the error of this digital value. However, a precise as possible a determination of the error requires a large number of dark rows, wherein the remaining statistical uncertainty of the determined mean value is always reflected in a further error not to be compensated. In addition, fluctuations of the error between different simultaneously digitized signals may not be taken into account in this respect.

In a conventional digital correlated double sampling, two digital values to be subtracted from one another are indeed generally available, but the reference signal values and image signal values determined successively by means of a single analog-to-digital converter may contain different errors since the occurring errors may differ for each digitizing process. For example, the generation of a voltage ramp or the starting of clock counters may lead to different offsets of the signals digitized in different digitizing processes, in particular successive digitizing processes. Fluctuations of the supply voltage of the imager and in particular of the analog-to-digital converters may also have an effect. By simultaneously applying the reference voltage signal and the image voltage signal to the first and second analog-to-digital converter, it is, in contrast, for example, possible to generate a common voltage ramp for both analog-to-digital converters and/or to synchronize clock counters such that an offset of the voltage ramp or of the clock counters affects the reference signal value and the image signal value in the same manner and may be compensated by a subtraction.

If two events take place simultaneously, this means in connection with the invention that the events may overlap in time and may in particular have a coinciding starting point in time and/or a coinciding end point in time.

As explained, the pixels of a column may be associated with a respective column line. The column line may in this respect form a column bus to apply the analog signals of a respective coupled pixel to the analog-to-digital converters. The coupling of the pixel and in particular of the detector element to the associated column line as well as the conducting of the signals to the analog-to-digital converters may generally also take place indirectly. For example, the analog signals of the pixel may be conducted to the column line via a converter transistor, in particular for impedance conversion, and via a selection switch. The application of the image voltage signal and/or the reference voltage signal to the respective signal inputs of the analog-to-digital converters may further in particular take place via interposed memories, for example interposed capacitors. In addition, amplifier circuits for amplifying the pixel signals, in particular column amplifiers, may be provided between the pixels and the analog-to-digital converters.

The image sensor may in particular have a plurality of converter units, wherein each converter unit may be associated with a single column in some embodiments or with a plurality of columns of the image sensor in other embodiments. Each converter unit may also be associated with one or more column lines. For example, an associated converter unit may be provided for each column and each column line of the image sensor such that all the pixels of a row may be read out simultaneously and their analog signals may be applied to the respective analog-to-digital converters of the converter units. Furthermore, it is possible for a converter unit to be associated with a plurality of columns of the image sensor, for example two columns or four columns of pixels, such that pixels may, for example, be read out alternately or in an alternating manner in the columns and their signals may be digitized. In this respect, a pixel of one column may in particular be read out and the respective reference voltage signals and image voltage signals may be formed, while previously formed reference voltage signals and image voltage signals of a previously read-out pixel of another column may be digitized.

Furthermore, a converter unit may be associated with a plurality of column lines whose pixels may be arranged in a common column or in different columns. For example, the pixels of a column may be associated with a plurality of column lines, for example two or four column lines, wherein a common converter unit may be provided for all of the plurality of column lines.

A respective pair of analog-to-digital converters may generally be provided for one column or for a group of a plurality of columns. For example, a respective pair of analog-to-digital converters may be provided for two, four, or eight columns. In this respect, the columns that are associated as a group with a respective pair of analog-to-digital converters do not necessarily have to be arranged next to one another. In addition, one or more column lines, which are associated with the pair of analog-to-digital converters, may be provided for each of the columns. It is also possible for the pixels of a column to be divided, with a first portion of the pixels of the column being associated with a first pair of analog-to-digital converters, while a second portion of the pixels of the column is associated with a second pair of analog-to-digital converters.

The analog-to-digital converters and/or the converter unit may be part of the image sensor. The analog-to-digital converters may in particular be formed in the same substrate as the pixels of the image sensor. Alternatively thereto, the analog-to-digital converters and/or the converter unit may be connected to the image sensor as separate units of the imager. An integration of the analog-to-digital converters in the image sensor may in this respect enable as compact as possible a design of the imager, while in particular a noise of the image sensor caused by heat arising during the digitizing may be reduced by a separate arrangement or design of the analog-to-digital converters.

The control device of the imager may also partly or completely be an integral part of the image sensor. The control device may in particular be partly or completely formed in the same substrate as the pixels of the image sensor. Alternatively, the control device may be partly or completely connected to the image sensor as a separate unit of the imager. The control device may also have a distributed design, wherein different sections of the control device are responsible for different control tasks (e.g. controlling the readout of the pixels, controlling the digitizing of the signals). The control device may, for example, comprise one or more of the following devices: an integrated circuit (IC); a microprocessor; a central processing unit (CPU); an application-specific integrated circuit (ASIC); or a field programmable gate array (FPGA).

Further embodiments of the invention may be seen from the dependent claims, from the description, and from the drawings.

In some embodiments, the converter unit may be configured to convert the reference voltage signal into the digital reference signal value by means of the first analog-to-digital converter and simultaneously convert the image voltage signal into the digital image signal value by means of the second analog-to-digital converter.

The first analog-to-digital converter and the second analog-to-digital converter may thus be operated at the same time and in particular in a synchronized manner to be able to simultaneously convert or digitize the respective analog signals applied, that is the reference voltage signal and the image voltage signal. For a synchronized operation of the analog-to-digital converters, a common voltage ramp may, for example, be generated and dock counters may be synchronized (in particular started together), as will be explained in the following. Due to such a simultaneous and in particular synchronized operation of the analog-to-digital converters, the image signal value and the reference signal value contain the same systematic errors that may be compensated by a subsequent subtraction of the reference signal value from the image signal value. In this respect, respective converter units having analog-to-digital converters may, for example, be provided for each column or each column line such that all the pixels of a row may be read out simultaneously and their analog signals may be converted. By compensating the errors generated during the digitizing, the occurrence of an offset in the digitized image that relates to the entire row and that is thereby clearly perceptible to the human eye may be prevented despite this row-wise readout and conversion. Also in the case of a readout and digitizing of the pixel of a row that merely take place after one another, for example in the case of an association of a converter unit with a plurality of columns of pixels, an occurrence, caused by the digitizing, of errors or fluctuations of the values determined for the pixels of a row read out after one another may be prevented in that the reference voltage signals and the image voltage signals of the respective pixels are always simultaneously converted such that the errors decisive for this digitizing process are correctly compensated.

In some embodiments, the converter unit may comprise a ramp generator and may be configured to generate a common voltage ramp for the first analog-to-digital converter and for the second analog-to-digital converter for simultaneously converting the reference voltage signal and the image voltage signal. The ramp generator may be controllable by the control device of the imager.

The first and second analog-to-digital converter may in this respect have a respective comparator having a first input and a second input, wherein the common voltage ramp may contact the first inputs of the first and second analog-to-digital converter, while the reference voltage signal may be applied to the second input of the first analog-to-digital converter and the image voltage signal may be applied to the second input of the second analog-to-digital converter by means of the control device. It may be achieved by such a common voltage ramp that both digital values, the image signal value and the reference signal value, which are formed by digitizing the underlying analog signals, the image voltage signal and the reference voltage signal, contain the same errors that are based on the voltage ramp used for the digitizing and that may thus be compensated by subtracting the reference signal value from the image signal value. For example, an offset of the voltage ramp, which may be different for consecutive digitizing processes due to statistical fluctuations, thereby has the same effect on the image signal value and the reference signal value of a respective pixel such that such an effect may be compensated by a subtraction.

In some embodiments, the first analog-to-digital converter may have a first clock counter and the second analog-to-digital converter may have a second clock counter, wherein the converter unit may be configured to synchronize the clock counters of the first analog-to-digital converter and the second analog-to-digital converter. Due to the synchronous operation of clock counters for the two analog-to-digital converters, a synchronized digitizing process may be achieved overall for the reference voltage signal and the image voltage signal in order to generate the image signal value and the reference signal value with errors that are as identical as possible or correspond to one another as precisely as possible and that may thereby be compensated. Any deviations between the simultaneously converted analog signals that are caused by differently running or, for example, not completely simultaneously started dock counters may thereby be avoided.

In this respect, provision may in particular be made to start the first dock counter and the second dock counter by a common start signal. The common start signal may in particular be generated by the control device of the imager. It may thereby be ensured that the two clock counters start counting clock steps at the same point in time such that a relative error between the image voltage value to be determined and the reference voltage value to be determined may be avoided due to different starting points in time of the respective clock counters. Furthermore, the start signal for starting the clock counters may also be transmitted to the ramp generator such that the voltage ramp, the first clock counter, and the second clock counter may be started synchronously.

To digitize the voltage signal applied to an analog-to-digital converter, the clock counter of the respective analog-to-digital converter may be stopped as soon as the voltage of a voltage ramp generated jointly for the two analog-to-digital converters reaches the voltage signal applied to the analog-to-digital converter, that is the reference voltage signal or the image voltage signal. A digital value may then be associated with the number of clock steps that took place between the start signal and the stop of the clock counter in order to form the image signal value or the reference signal value. Consequently, the respective points in time at which the clock counters are stopped may differ from one another in dependence on the respective level of the applied voltage signals.

Furthermore, in particular in addition to the transmission of a common start signal to the first clock counter and the second clock counter, provision may be made in some embodiments to also synchronize the cycle of the two clock counters. For this purpose, the converter unit may, for example, have a common clock generator for the first clock counter and the second clock counter, said common clock generator predefining the cycle for the two clock counters such that the two clock counters may perform a respective clock step at the same time. The converter unit may thus in particular have a common clock for the first and second clock counters that predefines the cycle for the two clock counters. A possible relative error between the reference signal value, which is determined based on the number of clock steps of the first clock counter, and the image signal value, which is determined based on the number of clock steps of the second clock counter, may thus also be prevented. In some embodiments, the clock generator may also be configured to generate the common start signal for the first clock counter and the second clock counter. The clock generator may be controlled by the control device of the imager in some embodiments.

In some embodiments, the imager may further comprise a computing unit that is configured to determine a pixel image value for each pixel by subtracting the digital reference signal value from the digital image signal value. The imager may thus be configured to ultimately output a digital pixel image value for each pixel, said digital pixel image value being proportional to the electric charge generated during the exposure or proportional to the light incident during the exposure. Due to the subtraction of the reference signal value from the image signal value, any noise of the image sensor, which may still be reflected in the image signal value itself, may in this respect be compensated, on the one hand. On the other hand, as explained above, errors which occur during the digitizing process and which the two digital values obtained from the analog signals, the image signal value and the reference signal value, equally contain may also be compensated by this subtraction. Thus, a digital pixel image value may be output that is precisely proportional to the charge at the light-sensitive detector element that is generated during the exposure. The computing unit may, for example, comprise an integrated circuit (IC); a microprocessor; a central processing unit (CPU); an application-specific integrated circuit (ASIC); or a field programmable gate array (FPGA).

In some embodiments, the image sensor may have at least one memory unit, wherein the memory unit comprises a first memory for holding the reference voltage signal. In some embodiments, the memory unit may further comprise a first memory for holding the reference voltage signal and a second memory for holding the image voltage signal.

In this respect, at least one memory unit may in particular be provided for each column and/or each column line of the image sensor. At least one memory unit may be associated with each column and/or each column line of the image sensor. Furthermore, a memory unit may generally also be associated with a plurality of columns and/or column lines such that respective signals from pixels of different columns or via different column lines may, for example, be alternately read into the memory unit.

The memories may in particular comprise respective capacitors and/or be configured as capacitors to which the analog signals to be held may be held as a voltage. Depending on the analog signal to be held, the voltage may in this respect be proportional to the charge generated at the detector element during an exposure or may be proportional to the reference value. The analog signals held may be simultaneously applied to the respective signal inputs by coupling the respective memory or capacitor to the analog-to-digital converters such that the voltages held may form input signals for the analog-to-digital converters for determining the reference signal value and/or the image signal value.

The memory unit may in particular comprise at least a first memory for holding the reference voltage signal to be able to store the reference voltage signal for a subsequent simultaneous digitizing with the image voltage signal while the image voltage signal is formed. In this respect, the reference voltage signal may in particular be fed to a capacitor via the column line by closing a selection switch to be able to hold the reference voltage signal at the capacitor after the opening of the selection switch and to be able to read out the charge generated at the detector element via the column line. The image voltage signal may in this respect likewise be stored, in particular for a short time, for which purpose a second memory configured as a second capacitor may, for example, be provided and may be selectively coupled to the column line by a further selection switch. Alternatively thereto, the image voltage signal may also be applied directly to the second analog-to-digital converter.

The first memory may generally be permanently coupled to the respective column line or may be couplable via a switch. The first memory may further be permanently coupled to the first analog-to-digital converter or may be couplable via a switch. The second memory—if a second memory is provided—may also be permanently coupled to the respective column line or may be couplable via a switch. The second memory may further be permanently coupled to the second analog-to-digital converter or may be couplable via a switch. In general, individual switches or a switch network having a plurality of switches may be provided between the memories and the analog-to-digital converters.

In some embodiments, the image sensor may have a memory reset device that is configured to selectively reset the memory to a memory reference value. In this respect, provision may in particular be made to reset the memory between the reading out of different pixels. For this purpose, the memory reset device may, for example, comprise a switch via which the respective memory may be selectively couplable to a reference potential or a power source in order to prepare the memory for receiving and correctly holding a respective subsequent reference voltage signal or image voltage signal.

In some embodiments, the image sensor may have at least a first and a second memory unit, wherein each of the first and second memory units comprises a first memory for holding the reference voltage signal and a second memory for holding the image voltage signal, wherein the control device may be configured to selectively connect the signal input of the first analog-to-digital converter to the first memory of the first memory unit and simultaneously connect the signal input of the second analog-to-digital converter to the second memory of the first memory unit, or to connect the signal input of the first analog-to-digital converter to the first memory of the second memory unit and simultaneously connect the signal input of the second analog-to-digital converter to the second memory of the second memory unit.

The memories of the memory units may in particular be configured as respective capacitors to hold the reference voltage signal and the image voltage signal before the application to the analog-to-digital converters or before the digitizing. In such embodiments, at least a first and a second memory unit, which have two respective memories for holding an image voltage signal and a reference voltage signal, are consequently associated with a single first analog-to-digital converter and a single second analog-to-digital converter. In this respect, the two memory units may, for example, be associated with a common column line or with different column lines and/or columns of pixels.

Since the control device is configured to selectively connect the signal inputs of the two analog-to-digital converters to the memories of the first memory unit or to the memories of the second memory unit, it is in particular possible to read a reference voltage signal and an image voltage signal of a first pixel into one of the two memory units, while the reference voltage signal held in the first memory of the other memory unit and the image voltage signal of a further pixel held in the second memory of the other memory unit are digitized in the same time interval. In addition, since a single converter unit having a first analog-to-digital converter and a second analog-to-digital converter is associated with two memory units, the total number of required analog-to-digital converters may be reduced in order, for example, to be able to limit the expansion of the imager or an occurrence of heat caused by the operation of the analog-to-digital converters.

For example, the first and second memory units may be associated with different columns of pixels such that at least two columns of pixels may share a common converter unit having a single first analog-to-digital converter and a single second analog-to-digital converter. The number of required analog-to-digital converters of the imager may thereby be maintained in comparison with conventional solutions even though a simultaneous digitizing of the reference voltage signals and the image voltage signals of respective pixels and the compensation of errors occurring during the digitizing are made possible.

Alternatively thereto, provision may also be made that the first and second memory units are associated with the same column of pixels. In this respect, the first memory unit and the second memory unit may in particular be associated with the same column line or with different column lines. For example, provision may be made to divide the pixels of a column into two groups or sections with which a respective column line is associated. An image sensor is, for example, known from DE 10 2008 052 916 A1 in which the pixel field is divided into an upper half and a lower half in which mutually separate column lines extend. However, other divisions are generally also possible and the column lines may extend in parallel with one another and in one direction to be able to be coupled to the respective memory units that may then be connected to the analog-to-digital converters. Furthermore, the memory units may be associated with the same column line, wherein the control device may be configured to selectively couple the column line to one of the memories of the first memory unit or one of the memories of the second memory unit. Such a provision of two memory units for a column of pixels may in this respect enable an accelerated readout of the column in that the time required for reading in a reference voltage signal and an image voltage signal is used for digitizing the analog signals of a further pixel of the column previously read into the memory units.

In some embodiments, the image sensor may have one or more pairs of first and second memory units for each column of pixels, wherein the image sensor may have a respective pair of first and second analog-to-digital converters for one pair or for two pairs of first and second memory units. The image sensor may in particular have two or four pairs of first and second memory units for each column of pixels. For example, provision may be made that a converter unit having a pair of first and second analog-to-digital converters is associated with two pairs of first and second memory units, wherein a respective pair of the two pairs of first and second memory units may be associated with a column or column line. In this respect, reference voltage signals and image voltage signals of respective first pixels of the two column lines may, for example, be read into the respective first memory unit of the pairs of memory units in a time interval, while the respective second memory units are successively coupled to the analog-to-digital converters in the same time interval to convert the reference voltage signals and image voltage signals held therein. The time required for reading out the pixel may hereby also be reduced since a time during which two digitizing processes may be performed may be required for the readout of a respective image voltage signal. Thus, in a time interval required for the reading in of reference voltage signals and image voltage signals, such analog signals for two pixels may be simultaneously formed via two column lines and stored in respective first memory units, while two digitizing processes may be performed successively in the same time interval by converting analog signals previously stored in a respective second memory unit.

In some embodiments, the control device may be configured,
during a first time interval, to read the reference voltage signal and the image voltage signal of a first pixel into the first memory unit, and to apply the reference voltage signal and the image voltage signal of a second pixel from the second memory unit to the signal input of the first and second analog-to-digital converter and to simultaneously convert them there into the reference signal value and the image signal value; and, during a second time interval, to read the reference voltage signal and the image voltage signal of a third pixel into the second memory unit, and to apply the reference voltage signal and the image voltage signal of the first pixel from the first memory unit to the signal input of the first and second analog-to-digital converter and to simultaneously convert them there into the reference signal value and the image signal value.

In this respect, the reading of the reference voltage signal and the image voltage signal of the respective pixels into the associated memory units may in particular take place via the respective associated column line, wherein the reference voltage signal may generally be read into the respective first memory and the image voltage signal into the respective second memory of the memory unit after one another. The reading of the reference voltage signal and the image voltage signal into the respective memory unit may thus in particular comprise at least generating these signals, outputting the signals to or via the associated column line, and feeding the signals into the memory unit.

The reference voltage signals and image voltage signals read in may in particular be simultaneously applied to the signal inputs of the first and second analog-to-digital converter. In this respect, this application may in particular comprise coupling the signal input of the first analog-to-digital converter to the first memory of the respective memory unit and coupling the signal input of the second analog-to-digital converter to the second memory of the respective memory unit.

The second time interval may follow the first time interval immediately or with a delay.

In such embodiments, the reference voltage signal and the image voltage signal of the first pixel are consequently formed and stored during the first time interval, while the time required therefor is used to digitize the reference voltage signal and the image voltage signal of the second pixel in this first time interval. In this respect, the analog signals of the second pixel may in particular have been stored in the second memory unit in a previous time interval. During the second time interval, the reference voltage signal stored in the first time interval and the image voltage signal of the first pixel stored in the first time interval are then digitized, while the reference voltage signal and the image voltage signal of a third pixel are formed and stored in the second memory unit in this second time interval. The first time interval and the second time interval may in this respect be repeated cyclically in order to successively read out the image sensor in this way and to use a respective time interval for forming analog reference voltage signals and image voltage signals of a pixel and for digitizing analog signals of a further pixel. Thus, the reference voltage signal and the image voltage signal of the third pixel may, for example, be converted in a third time interval, while analog signals of a fourth pixel are read into the first memory unit. The first time interval and the second time interval may generally follow one another directly and be repeated cyclically, while it is also possible that further time intervals or actions are provided between and/or in the first time interval and/or the second time interval.

For a faster readout of a column, a pixel of the same column may, for example, be read out or its reference voltage signal and image voltage signal may be read into one of the memory units, while the reference voltage signal and the image voltage signal of a further pixel of this column are simultaneously digitized by applying the other memory unit to the analog-to-digital converters. The column may in this respect be passed through successively, wherein respective analog signals of a pixel are formed and stored while the analog signals of a pixel previously read out are converted. In this respect, at least two analog-to-digital converters may consequently be provided per column for an accelerated readout.

Alternatively thereto, two analog-to-digital converters may be jointly provided for two columns, wherein, for example, a pixel of the one column may be read out and the reference voltage signal and the image voltage signal of this pixel may be stored in a respective memory unit, while the previously formed analog signals of a pixel of the other column are converted by applying the associated memory unit to the analog-to-digital converters. Due to such a procedure, the number of analog-to-digital converters per column may in particular be reduced, wherein the readout time per row may be increased with respect to a provision of two analog-to-digital converters per column line or column. However, provision may generally also be made to associate more than two memory units, for example four memory units, with an analog-to-digital converter. In this respect, a respective pixel may, for example, be read out simultaneously in two columns in a time interval and the associated reference voltage signals and image voltage signals may be stored in associated memory units, while previously formed reference voltage signals and image voltage signals of two pixels from the respective columns, which are held in the remaining two memory units, are converted in the time interval. The time for reading out an image voltage signal and a reference voltage signal of a pixel, said time being increased with respect to the digitizing process, may in this respect be used to perform two digitizing processes and to reduce the time for reading out the image sensor.

In some embodiments, the first pixel, the second pixel, and the third pixel may belong to the same column of pixels and may be associated with the same column line. Alternatively thereto, in other embodiments, the first pixel, the second pixel, and the third pixel may belong to the same column of pixels, with the first pixel and the second pixel being associated with different column lines. In some embodiments, provision may further be made that the first pixel and the second pixel belong to different columns of pixels.

For example, provision may thus be made that the first pixel, the second pixel, and the third pixel are read out via the same column line such that the column line may be alternately coupled to the two memory units to successively read in the signals of the pixels. The first pixel, the second pixel, and the third pixel may further indeed be arranged in the same column of pixels, but may be associated with different column lines. In this respect, the two memory units may, for example, be associated with a respective column line such that in particular two column lines of a column may be successively or alternately coupled to a respective associated one of the two memory units in order to read in respective analog signals of a pixel associated with the respective column line and, in the meantime, to read out analog signals of a pixel of the other column line previously read into the other memory unit. Thus, the first pixel and the second pixel may, for example, be associated with different column lines and the third pixel may be associated with the same column line as the second pixel. The first pixel and the second pixel may also belong to different columns, wherein the second pixel and the third pixel may, for example, belong to a first column of pixels, while the first pixel belongs to a second column of pixels. The converter unit having a first analog-to-digital converter and a second analog-to-digital converter may thus in particular be associated with two different columns of pixels such that the analog signals of a pixel of the one column may be converted, while the analog signals of a pixel of the other column are read into the associated memory unit.

In some embodiments, the first memory unit and the second memory unit may be associated with a single column line of a respective column, wherein the control unit may be configured, during the first time interval, to couple the first memory unit to the single column line and to decouple the second memory unit from the single column line; and wherein the control unit may be configured, during the second time interval, to couple the second memory unit to the single column line and to decouple the first memory unit from the single column line. In this respect, at least a first switch and at least a second switch may in particular be provided such that the single column line may be coupled to the first memory unit via the first switch and decoupled from the second memory unit via the second switch during the first time interval, while the single column line may be coupled to the second memory unit via the second switch and decoupled from the first memory unit via the first switch in the second time interval. The control device may consequently be configured to successively read out analog signals of pixels, which are read out via a single column line, into respective memory units. The memory unit may in particular further be configured to couple the respective memory unit decoupled from the column line to the signal inputs of the analog-to-digital converters to be able to convert previously read-in analog signals of a further pixel during the forming of the reference voltage signal and the image voltage signal of a pixel. For this purpose, the memories of the memory units may be connected to the signal inputs of the analog-to-digital converters via respective further switches such that the memories may be selectively coupled to the signal inputs of the analog-to-digital converters or decoupled from the signal inputs by closing or opening the switches.

Alternatively thereto, in some embodiments, the first memory unit and the second memory unit may be associated with two different column lines, wherein the control device may be configured, during the first time interval, to couple the first memory unit to a first one of the two different column lines and to decouple the second memory unit from a second one of the two different column lines; and, during the second time interval, to couple the second memory unit to the second one of the two different column lines and to decouple the first memory unit from the first one of the two different column lines. In this respect, the two different column lines may, as explained above, generally be associated with the same column of pixels or two different columns of pixels. In particular at least a first switch may again be provided to selectively couple or decouple the first memory unit to or from the first column line, and at least a second switch may be provided to selectively couple or decouple the second column line to or from the second memory unit. Such an association of the memory units with different column lines makes it possible to read in analog signals of one pixel via the one column line, while analog signals of another pixel previously read in via the other column line are digitized.

In some embodiments, the control device may be configured, during the first time interval, to decouple the first memory unit from the first and second analog-to-digital converter and to couple the second memory unit to the first and second analog-to-digital converter, wherein the control device may further be configured, during the second time interval, to couple the first memory unit to the first and second analog-to-digital converter and to decouple the second memory unit from the first and second analog-to-digital converter. In this respect, at least a first switch may in particular also be provided to selectively couple the first memory unit to the first and second analog-to-digital converter or to decouple it from the analog-to-digital converters, and at least a second switch may be provided to selectively couple the second memory unit to the first and second analog-to-digital converter or to decouple it from the analog-to-digital converters. Two first switches and two second switches may in particular be provided to selectively couple the respective first memories and second memories of the two memory units to the associated analog-to-digital converters.

In a respective time interval, one of the memory units may thus be coupled to the analog-to-digital converters, while the other memory unit is decoupled from the analog-to-digital converters in the time interval. In the following time interval, the coupling may be reversed such that signals may be alternately converted from the memory units or read into the memory units. The time for reading analog signals of a pixel into one of the memory units may consequently be used to convert previously read-in analog signals of a further pixel in the same time interval or in the time interval required for this purpose.

In some embodiments, each column of pixels may have a plurality of column lines, in particular two or four column lines, wherein, for each column of pixels, the pixels of the column may be associated with different ones of the plurality of column lines. The pixels of each column may in particular be associated with a respective one of the plurality of column lines via a respective selection switch. For example, a plurality of column lines of a column may extend in parallel with one another. In a pixel field having a plurality of column lines per column, provision may in particular be made that the pixel field is divided into an upper half and a lower half, in which mutually separate column lines extend such that the respective pixels of the column may be associated with one of the column lines in dependence on their position. Provision may, however, generally also be made that another division or allocation of pixels of a column to different column lines may also be provided. The allocation of pixels to column lines may in this respect be regular, for example in halves or quarters, or irregular.

In some embodiments, the respective pixel may further comprise a readout node; a transfer gate to selectively couple the light-sensitive detector element to the readout node; a converter transistor to convert the charge present at the readout node into a voltage signal; and a selection switch that is connected to a signal output of the converter transistor to selectively couple the signal output of the converter transistor to the associated column line. Alternatively to such a four-transistor design, the respective pixel may, however, also be configured in a simpler manner, such as shown in DE 10 2009 019 034 A1. It is equally possible that additional transistors are also provided, wherein the respective pixel may, for example, be formed in a five-transistor architecture having an overflow capacitor.

The invention further relates to a method of reading out an image sensor, in particular a CMOS image sensor, for electronic cameras that has a plurality of pixels arranged in rows and columns, wherein at least one common column line is associated with a plurality of pixels in a column, and wherein each pixel comprises a light-sensitive detector element, which is configured to generate electric charge from light incident during an exposure, and a reset device that is configured to reset charge present in the pixel to a reference value. The method in this respect at least comprises the following steps:

resetting the charge present in a respective pixel (in particular in a readout node of the pixel) by means of the reset device;

coupling the pixel to the column line and outputting a reference voltage signal corresponding to the reference value;

coupling the pixel to the column line and outputting an image voltage signal corresponding to the charge generated; and applying the reference voltage signal of the respective pixel to a signal input of a first analog-to-digital converter and simultaneously applying the image voltage signal of the respective pixel to a signal input of a second analog-to-digital converter.

The exposure of the detector element may take place before the output of the image voltage signal, in particular before or still during the output of the reference voltage signal.

As explained above, it may be achieved by the simultaneous application of the reference voltage signal and the image voltage signal to the two analog-to-digital converters that the corresponding digitized values—the reference signal value and the image signal value—contain respective identical errors that are based on the digitizing process. By subtracting the two values from one another, a digital value proportional to the charge actually generated at the detector element may consequently be determined in the course of the correlated double sampling and any noise of the image sensor may be compensated, wherein errors caused by the digitizing process may additionally be compensated. Thus, a digital value that is as precisely proportional as possible to the electric charge actually generated or to the light incident during the exposure may be output for each pixel.

In some embodiments, the reference voltage signal may be converted into a digital reference signal value by means of the first analog-to-digital converter and the image voltage signal may simultaneously be converted into a digital image signal value by means of the second analog-to-digital converter. The two analog-to-digital converters may thus be simultaneously operated for the digitizing of the respective analog signals in order to avoid the occurrence of different errors of the image signal value and the reference signal value due to digitizing processes that differ from one another.

In some embodiments, provision may be made that a common voltage ramp is generated for the first analog-to-digital converter and for the second analog-to-digital converter. In addition, in some embodiments, the two analog-to-digital converters may be operated with synchronized clock counters. The digitizing process may thus take place synchronized as precisely as possible for the image voltage signal and the reference voltage signal of a respective pixel such that the output digital image signal value and the output digital reference signal value may contain errors that correspond as accurately as possible to one another and that may thereby be completely compensated.

The reference signal value may be subtracted from the image signal value in some embodiments and a pixel image value may thereby be formed. The pixel image value may in this respect ultimately be output and indicates a value that is proportional to the charge generated at the detector element of the respective pixel and that is corrected by subtracting the reference signal value from the image signal value both with respect to a noise of the image sensor and with respect to errors of the digitizing process.

In some embodiments, the reference voltage value may be held in a memory during the generation of the image voltage signal and in particular during the still ongoing exposure of the pixel. In some embodiments, the reference voltage signal may further be held in a first memory of a memory unit and the image voltage signal may be held in a second memory of the memory unit before the image voltage signal and the reference voltage signal are conducted to the respective signal inputs of the analog-to-digital converters. Thus, the reference voltage signal may in particular be buffered while the image voltage signal is generated to be able to simultaneously apply the reference voltage signal and the image voltage signal to the signal inputs of the respective analog-to-digital converters. The image voltage signal may generally also be held, in particular for a short time, before the reference voltage signal and the image voltage signal are simultaneously conducted to the signal inputs of the analog-to-digital converters.

In some embodiments, provision may further be made that, during a first time interval, the reference voltage signal and the image voltage signal of a first pixel are read into a first memory unit, wherein, during the first time interval, the reference voltage signal held in a second memory unit and the image voltage signal of a second pixel held in the second memory unit are applied to the signal input of the first analog-to-digital converter and the second analog-to-digital converter and are simultaneously converted (i.e. digitized) in the first and second analog-to-digital converter. During a second time interval, the reference voltage signal and the image voltage signal of the first pixel may be applied to the signal input of the first analog-to-digital converter and the second analog-to-digital converter and they may be simultaneously converted (i.e. digitized) there, wherein the reference voltage signal and the image voltage signal of a third pixel may be be read into the second memory unit during the second time interval. Consequently, a respective one pixel may be read out or its analog signals may be generated, while the analog signals of a further pixel, which has already been read out, are converted in the same time interval. This may in particular reduce the time required for reading out the image sensor.

In this respect, the first pixel, the second pixel, and the third pixel may be associated with the same column and the same column line, or the first pixel, the second pixel, and the third pixel may be associated with the same column, wherein the first pixel and the second pixel are associated with different column lines. Furthermore, the first pixel and the second pixel may be associated with different columns. In this respect, the second pixel and the third pixel may in particular be associated with the same column. Thus, a pair of analog-to-digital converters may be associated with one column and one column line; one column and a plurality of column lines; or a plurality of columns and a plurality of column lines.

In some embodiments, provision may be made that, during the first time interval, the reference voltage signal and the image voltage signal of a fourth pixel are read into a third memory unit, and the reference voltage signal of a fifth pixel held in a fourth memory unit is applied to the signal input of the first analog-to-digital converter and the image voltage signal of the fifth pixel held in the fourth memory unit is applied to the signal input of the second analog-to-digital converter and said reference voltage signal and image voltage signal of the fifth pixel are simultaneously converted (i.e. digitized) there. During the second time interval, the reference voltage signal and the image voltage signal of the fourth pixel may further be applied to the signal input of the first analog-to-digital converter and to the signal input of the second analog-to-digital converter and may be simultaneously converted (i.e. digitized) there and the reference voltage signal and the image voltage signal of a sixth pixel may be read into the fourth memory unit.

Provision may thus be made that, during the first time interval, reference voltage signals and image voltage signals of a first pixel and a fourth pixel are read into respective memory units, while previously formed reference voltage signals and image voltage signals of a second pixel and a fifth pixel are converted. The time required for reading in a reference voltage signal and an image voltage signal may thus be used to perform two digitizing processes and to successively connect respective memory units to the analog-to-digital converters. Similarly, in the following second time interval, the analog signals of the first pixel and the fourth pixel read into the memory units during the first time interval may be successively converted, while analog signals of a further two pixels, the third pixel and the sixth pixel, are read into the respective previously read-out memory units. In this respect, the first memory unit and the second memory unit may, for example, be associated with a common column of pixels and the third memory unit and the fourth memory unit may be associated with another common column such that reference voltage signals and image voltage signals of pixels of two columns may both be converted and read in during a respective time interval.

The invention will be explained in the following purely by way of example with reference to embodiments and to the drawings.

Figure 1B:
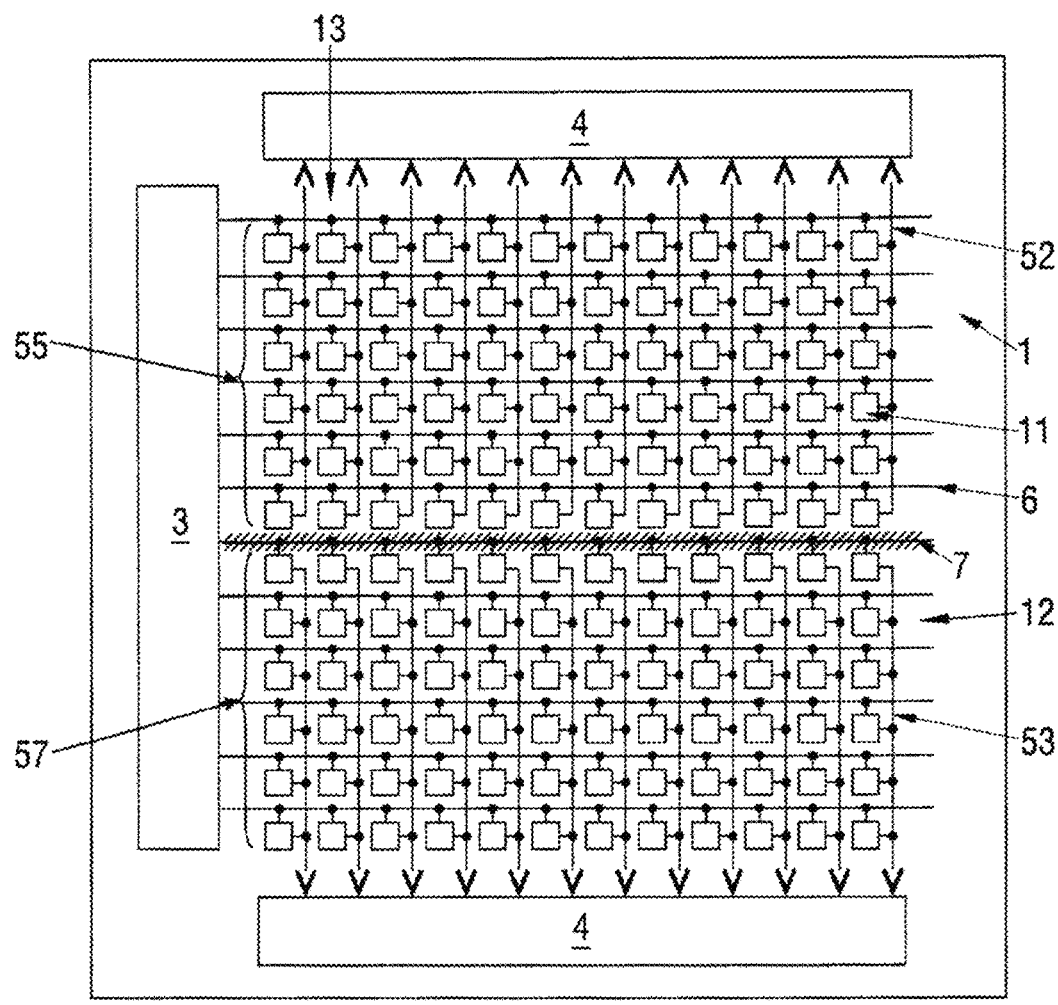
Figure 2:
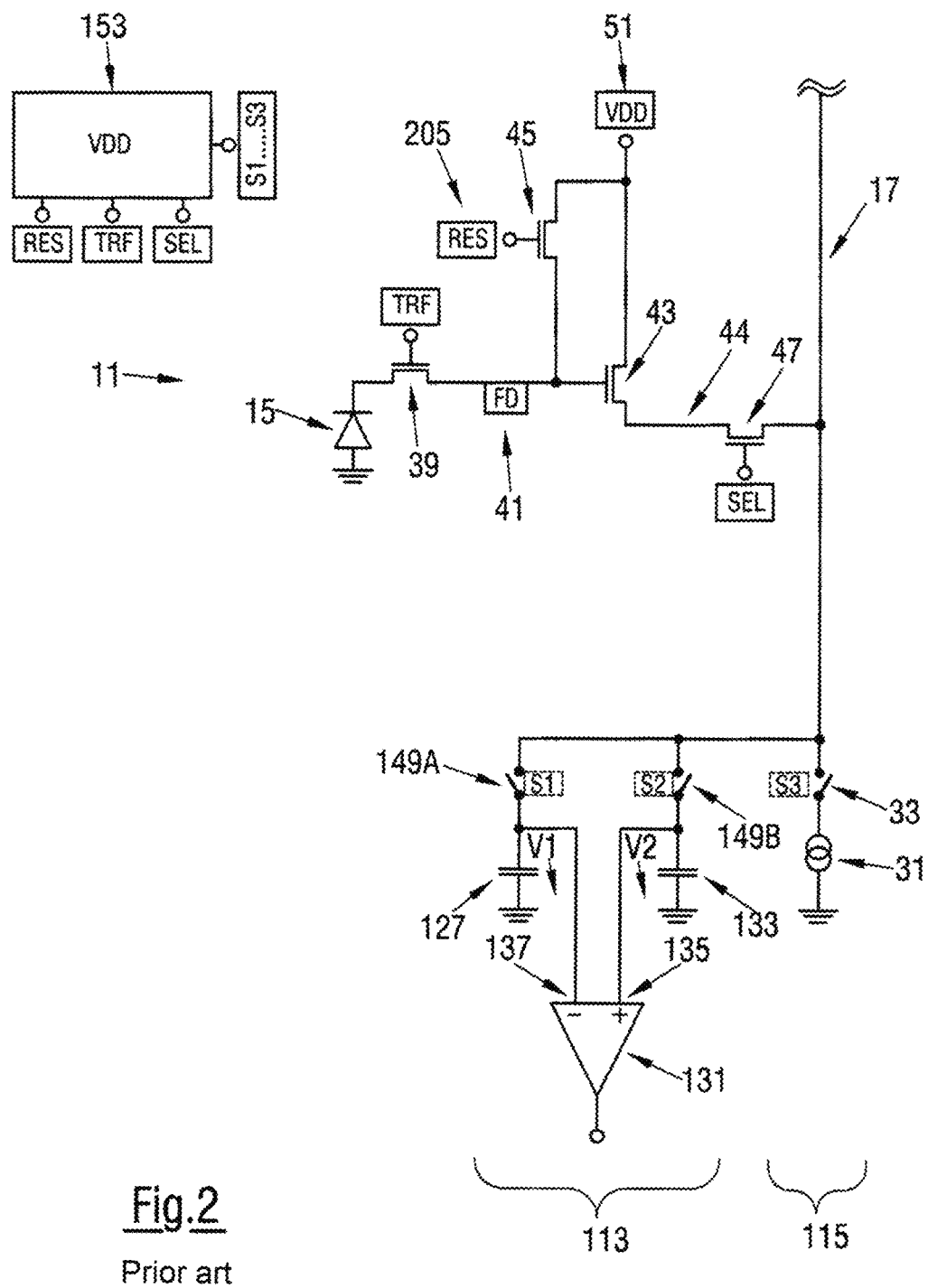
Figure 3:
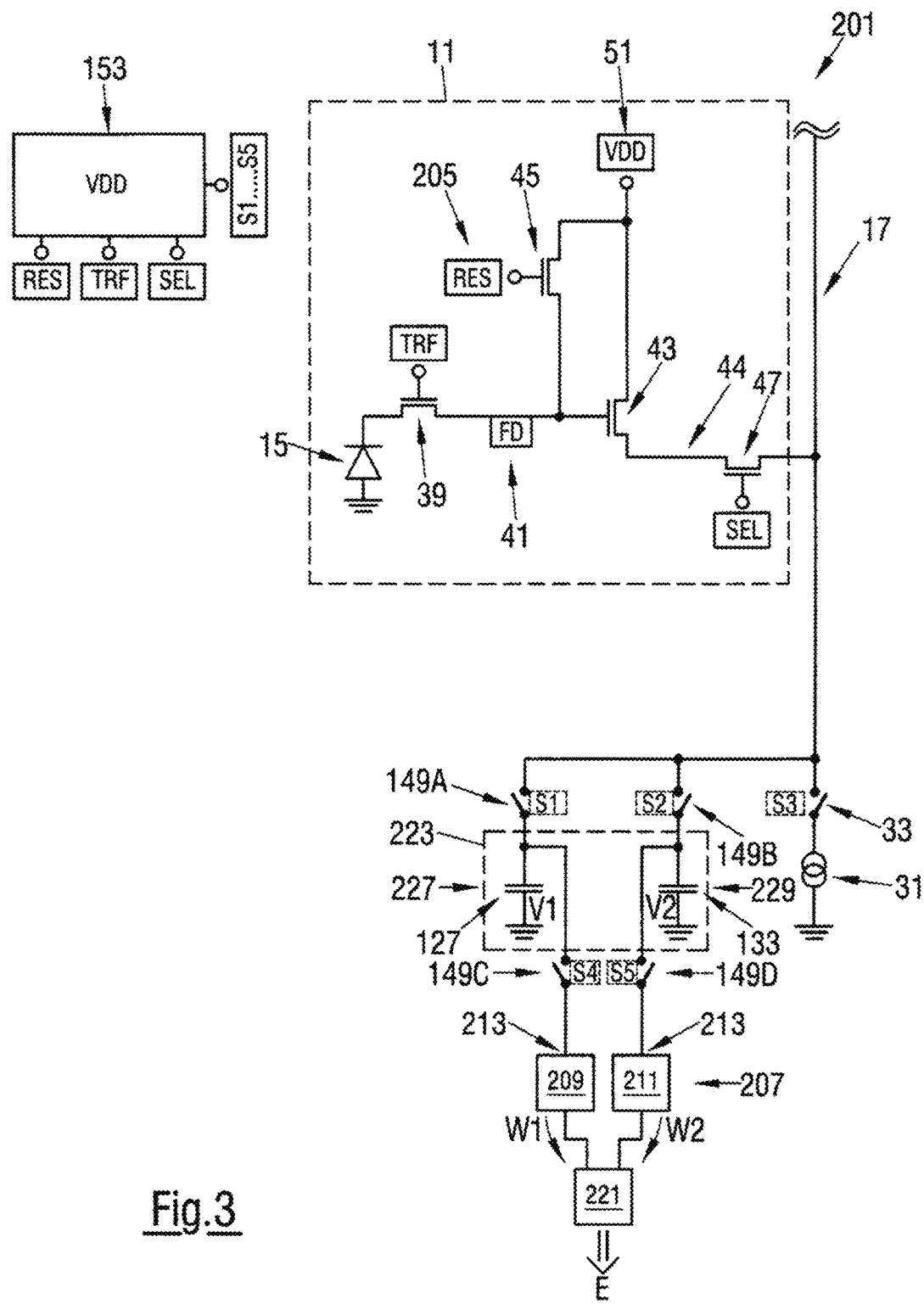
Figure 4:
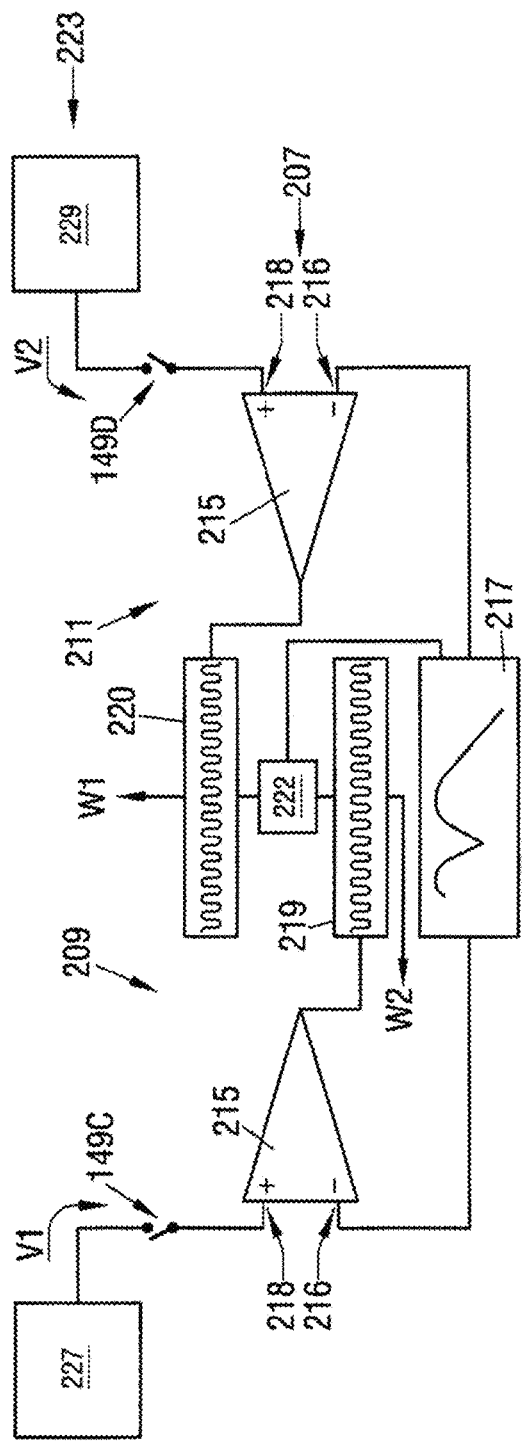
Figure 5A:
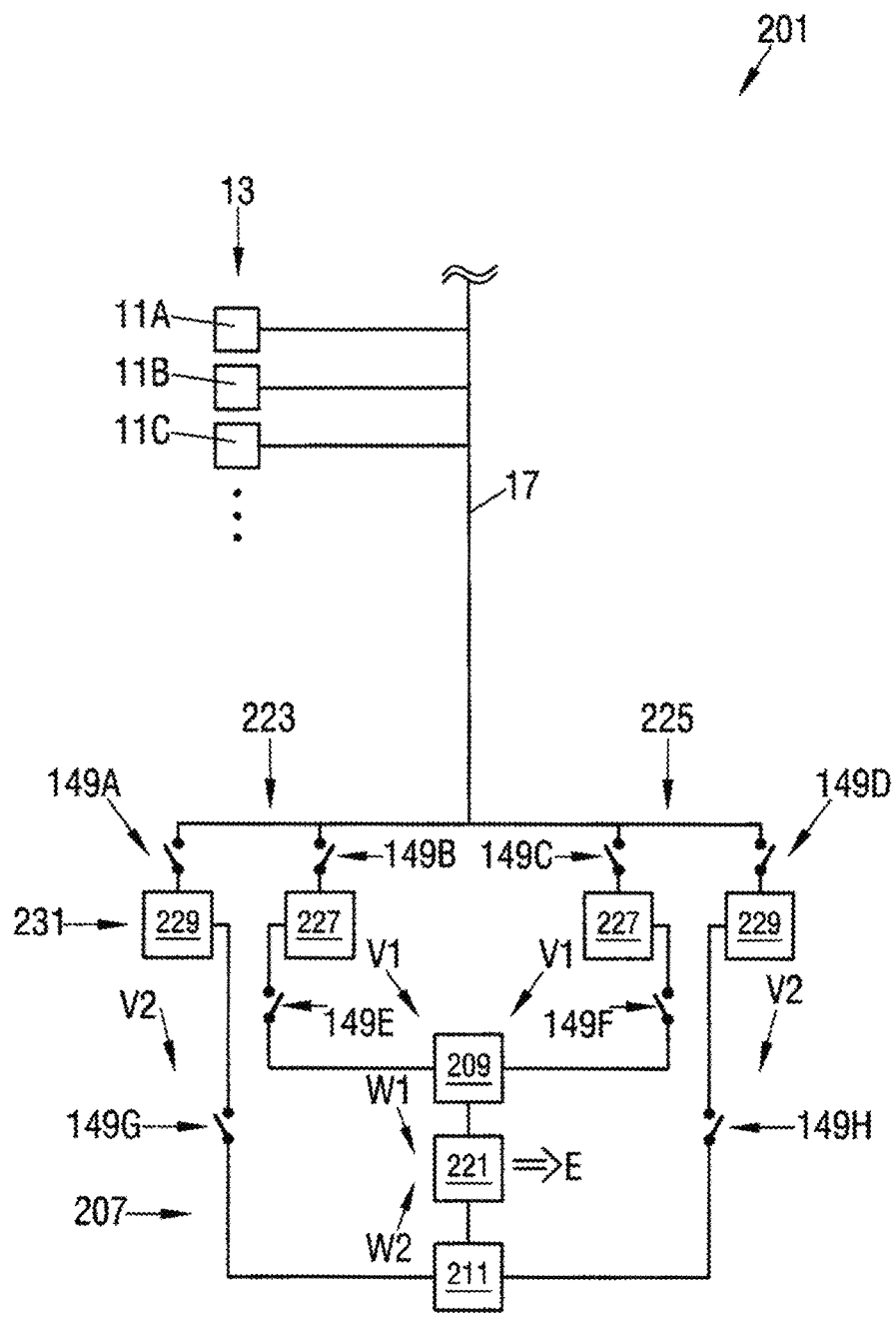
Figure 5B:
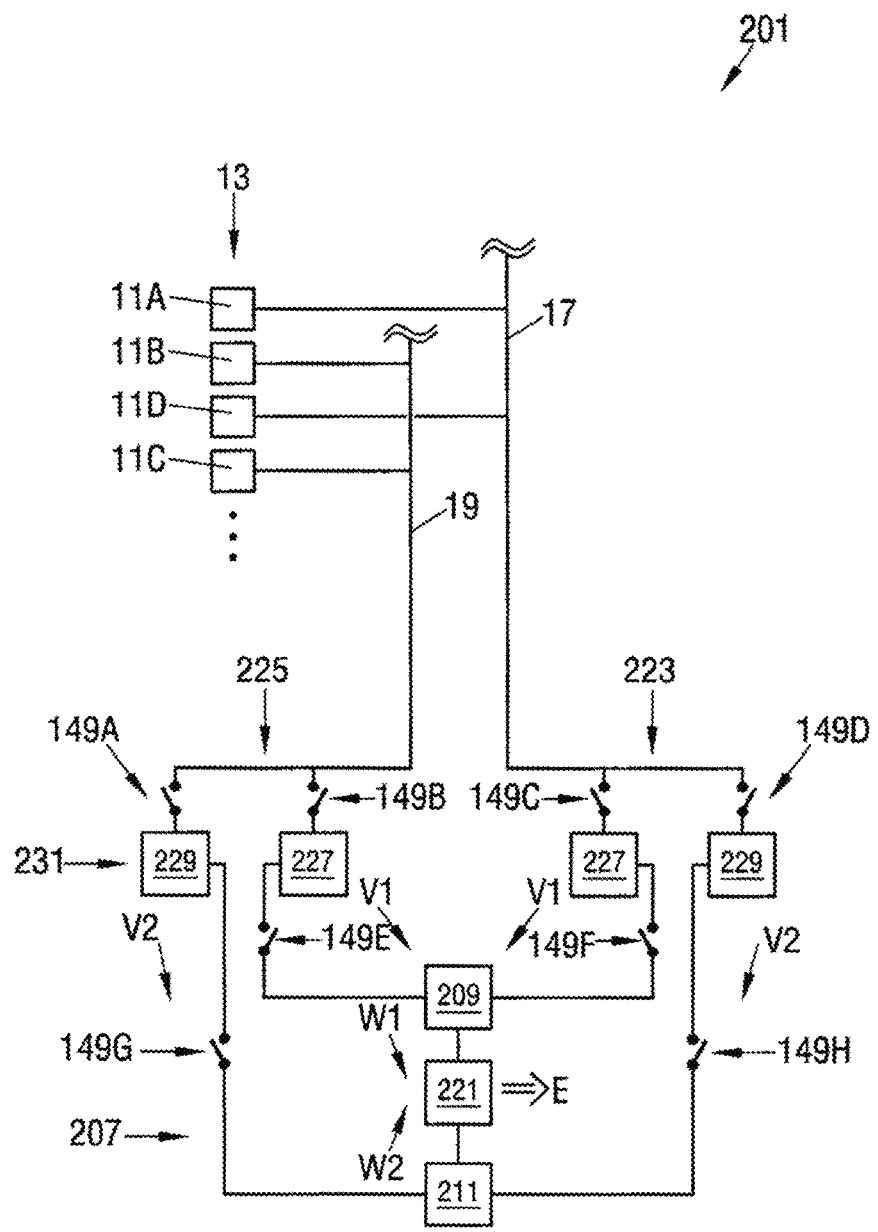
Figure 5C:
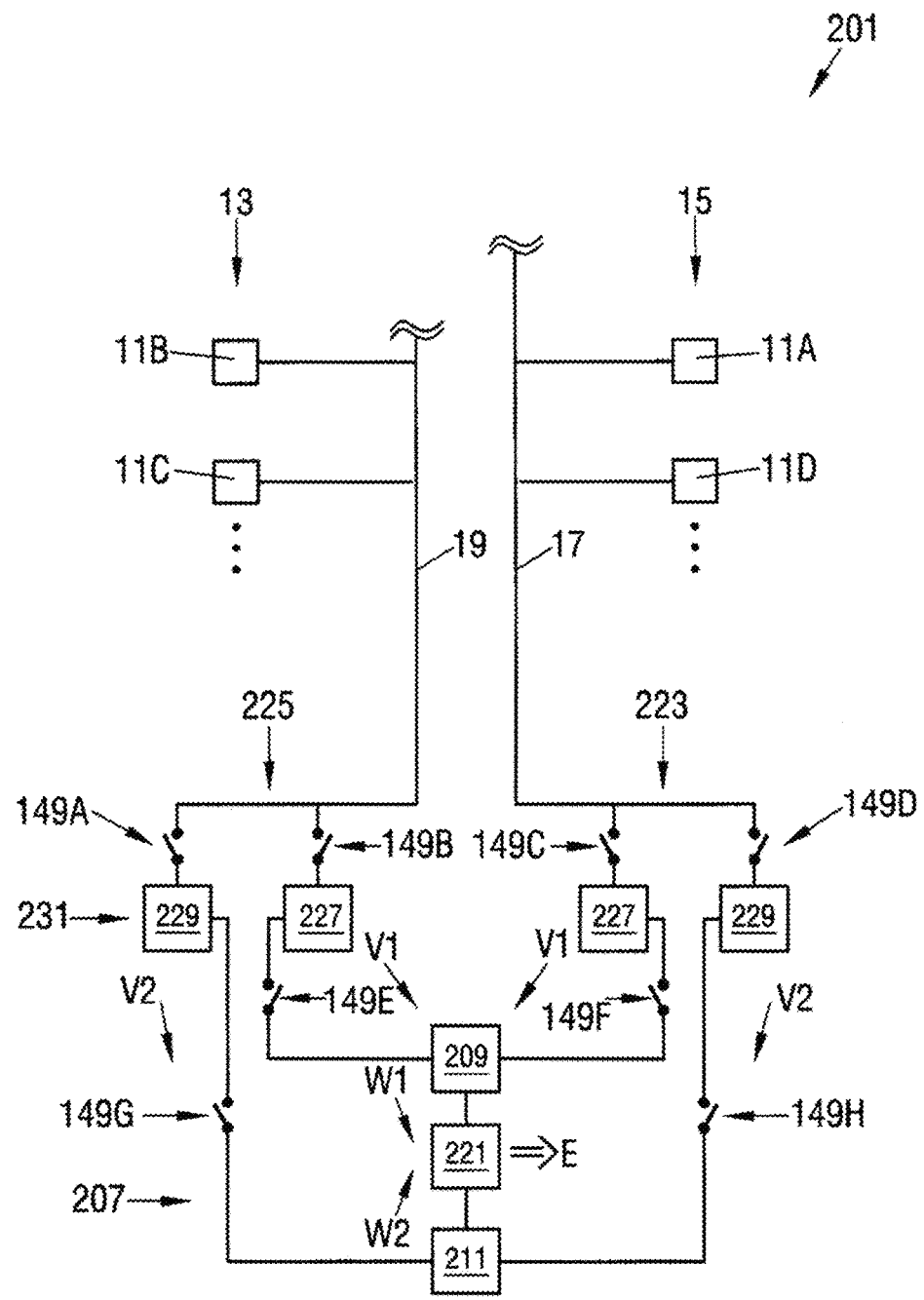
Figure 6:
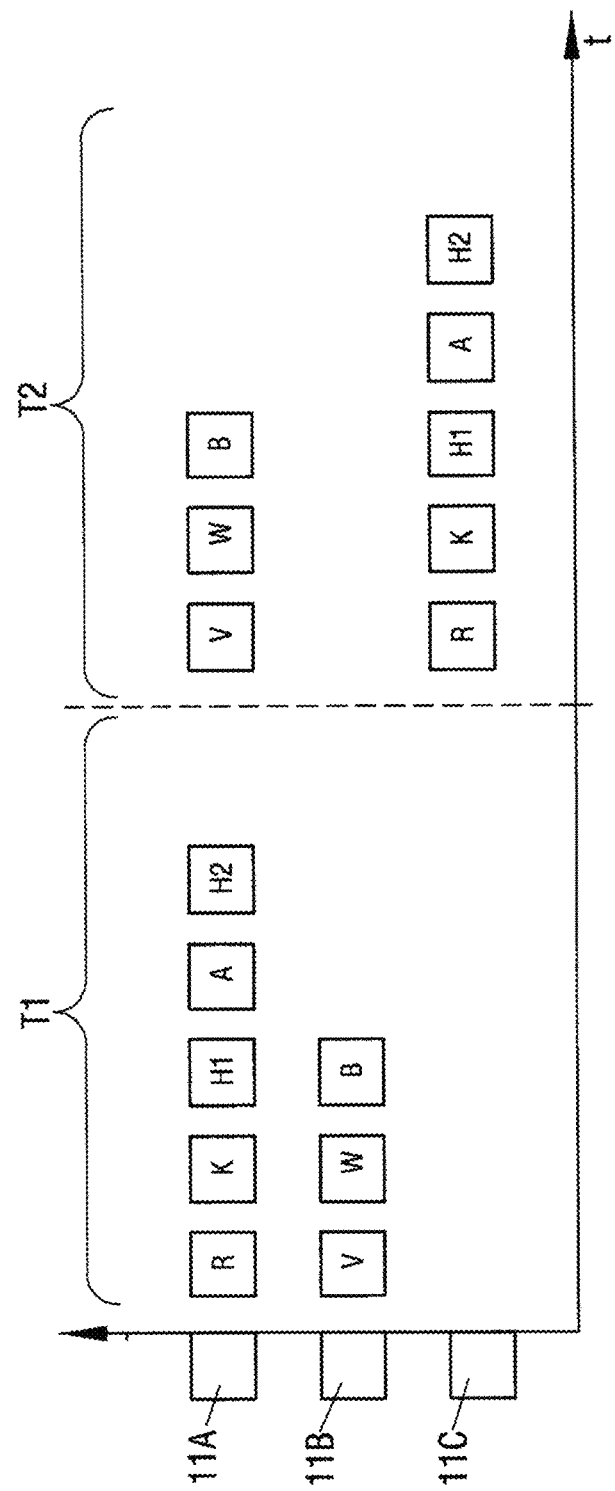
Figure 7:
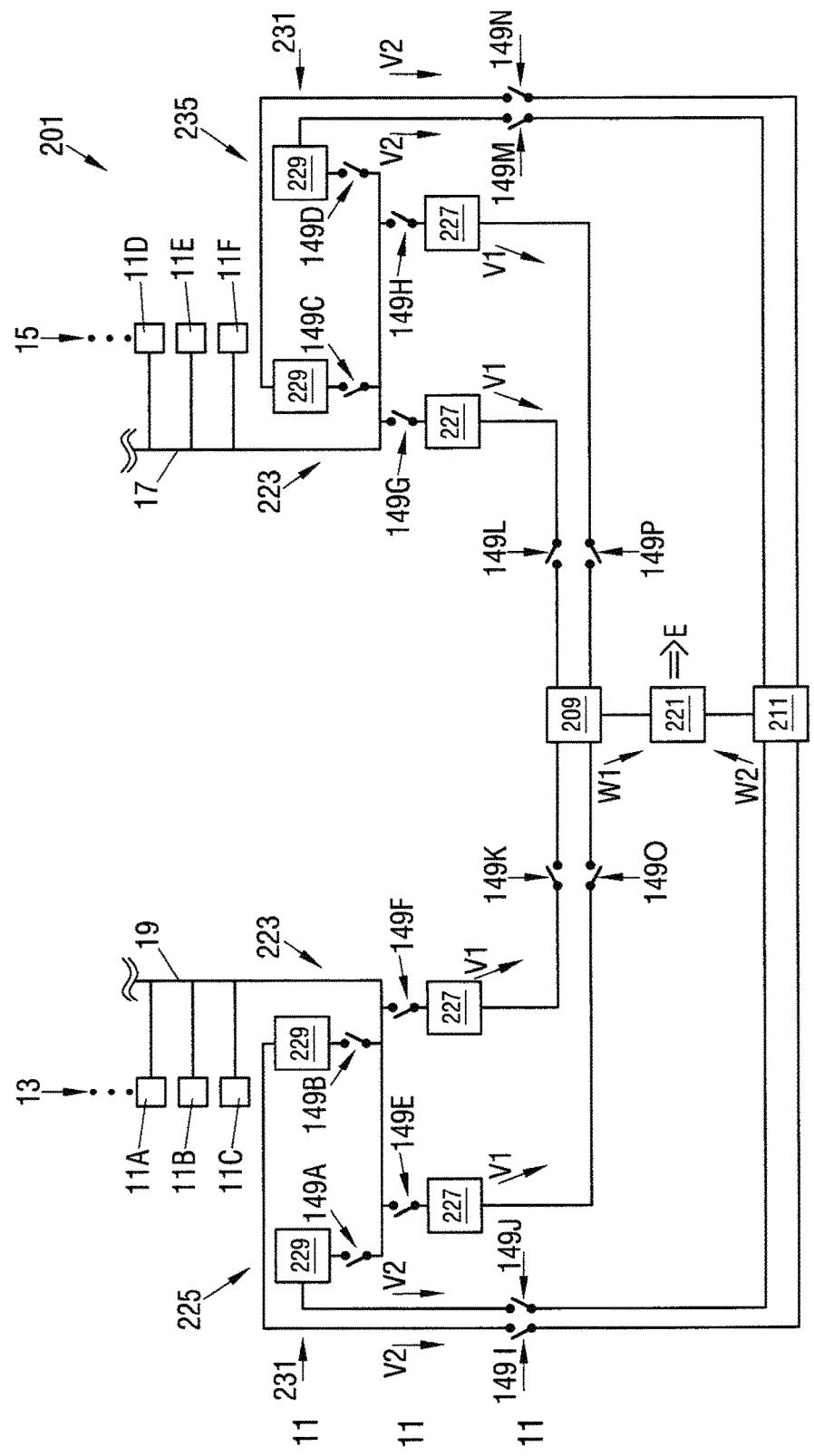

There are shown:

FIGS. 1A and 1B a respective schematic representation of image sensors known from the prior art having continuous column lines or column lines split at the center;

FIG. 2 a four-transistor CMOS image sensor in accordance with the prior art, wherein, of the image sensor, only one pixel and a column readout circuit associated with the column line of the pixel are shown;

FIG. 3 a schematic representation of an imager with a four-transistor CMOS image sensor and with a converter unit for simultaneously digitizing an analog reference voltage signal and an analog image voltage signal;

FIG. 4 a schematic representation of the converter unit with a first analog-to-digital converter and a second analog-to-digital converter;

FIGS. 5A-5C respective schematic representations of an imager with an image sensor and with two memory units that have two respective memories for holding reference voltage signals and image voltage signals of respective associated pixels;

FIG. 6 a schematic representation for illustrating the time sequence of the readout of the image sensor;

FIG. 7 a schematic representation of an imager with an image sensor and with four memory units that have two respective memories for holding reference voltage signals and image voltage signals of respective associated pixels; and FIG. 8 a schematic representation for illustrating the time sequence of the readout of the image sensor.

FIG. 1A shows by way of example an image sensor 1 for an electronic camera, in particular for an electronic motion picture camera. This image sensor 1 has a plurality of pixels 11 arranged in rows 12 and columns 13, wherein each pixel 11 has a light-sensitive detector element 15 to convert light incident during an exposure into the electric charge (cf. FIGS. 2 and 3).

The readout of such an image sensor 1 may, for example, take place row-wise, for which purpose a row addressing logic 3 is provided. For this purpose, the pixels 11 of a row 12 may be coupled via a row selection line 6 to a respective column line 17 that is associated with the pixels 11 arranged in a column 13. The signals of the pixels 11 of a row 12 may be transmitted via the column lines 17 to a column amplifier 4 by means of which the signals generated may be amplified and may thereupon be processed further, in particular digitized.

FIG. 1B shows a similar image sensor 1, wherein the pixels 11 in each column 13 are divided into an upper block 55 and a lower block 57, and wherein an upper column line 52 is provided for the pixels 11 of the upper block 55 and a lower column line 53 is provided for the pixels 11 of the lower block 57, via which upper and lower column lines the respective signals of the pixels 11 may be conducted to two column amplifiers 4. Such an association of two column lines 52 and 53 with pixels 11 of a column 13 may in particular accelerate the readout of the image sensor 1 in that two rows 12 of pixels 11 may be read out simultaneously. Furthermore, provision may also be made that a plurality of column lines 17, for example two, three, four or eight column lines 17, are associated with pixels 11 of a column 13, wherein some or all of these plurality of column lines 17 may extend in parallel with one another and in the same direction to be able to simultaneously transmit the signals of a plurality of pixels 11 of a column 13 to a common column amplifier 4.

The basic operation of an exemplary conventional four-transistor image sensor 1 of the APS (active pixel sensor) type will be explained in the following with respect to FIG. 2 for the better understanding of the invention, with individual components of this image sensor 1 also being present in an imager 201 in accordance with the invention that has an image sensor 1 (cf. FIG. 3). The present invention is, however, not generally restricted to an imager 201 comprising active four-transistor image sensors 1, but may rather also be used in imagers 201 comprising image sensors 1 that have fewer or more than four transistors per pixel 11.

Only a single pixel 11 is shown as representative in FIG. 2 that comprises a light-sensitive detector element 15 in the form of a photodiode, in particular in the form of a so-called pinned diode. The light-sensitive detector element 15 may selectively be charge-coupled via a switch in the form of a transfer gate 39 to a readout node 41 that is in particular formed as a so-called floating diffusion (FD).

The readout node 41 is connected to the gate terminal of a converter transistor 43 that is formed as a source follower, that is formed by a field effect transistor (FET), and that represents a charge-to-voltage converter circuit. Furthermore, the readout node 41 is connected to a voltage supply 51 (for example, a positive voltage supply) via a further switching device in the form of a reset switch 45. The reset switch 45 and the voltage supply 51 are in this respect part of a reset device 205 to be able to remove charge stored in the readout node 41 and reset the readout node 41 to a reference value. One of the two channel terminals (drain terminal) of the converter transistor 43 is likewise connected to the positive voltage supply 51, whereas the other of the two channel terminals (source terminal) of the converter transistor 43 forms a signal output 44 at which a voltage signal is output and which is connected to a selection switch 47 via an output line. The selection switch 47 functions as a row selection switch, wherein the signal output 44 of the converter transistor 43 may be selectively coupled to a readout line, which is associated with the represented pixel 11, in the form of a column line 17 by activating or closing the selection switch 47.

The column line 17 is provided to connect the pixels 11 of the same type arranged in an associated column 13 to a common column readout circuit 113, for example to a column amplifier circuit. This takes place in an alternating manner by temporarily closing the respective selection switch 47 of the pixels 11.

The column readout circuit 113 comprises a first capacitor or a reference value capacitor 127 that is connected to ground by a terminal and that is selectively couplable to the column line 17 by the other terminal via a switch 149A. The column readout circuit 113 furthermore comprises a second capacitor or signal value capacitor 133 that is likewise connected to ground by a terminal and that is likewise selectively couplable to the column line 17 by the other terminal via a further switch 149B. The column readout circuit 113 furthermore comprises an amplifier 131 at whose negative input 137 the voltage applied to the first capacitor 127 is applied and at whose positive input 135 the voltage applied to the second capacitor 133 is applied.

The transfer gate 39 of the respective pixel 11 is controllable via a control line TRF; the reset switch 45 is controllable via a control line RES; the selection switch 47 is controllable via a control line SEL; the switch 149A is controllable via a control line S1; and the switch 149B is controllable via a control line S2, in each case by a common control device 153.

A pre-charge circuit 115 is furthermore associated with the column line 17 outside the pixel field of the image sensor 1 (lower part of FIG. 2) and comprises a current source 31 that is selectively couplable to the column line 17 by means of a cut-off switch 33. The control of the cut-off switch 33 takes place by the common control device 153 via a control line S3.

The operation principle of such a pixel 11 will be described in the following by way of example based on a 3.3V CMOS technology. This method is also designated as correlated double sampling (CDS), wherein a CDS at an analogous level will be described in the following. Typically, all the pixels 11 in a row are read out in the same manner and in particular in parallel such that it is sufficient for the description of the readout process to only look at those pixels 11 that are connected to the same column line.

First, the light incident during an exposure process is converted by the light-sensitive element 15 into electric charge such that the light-sensitive element 15 fills with electrons. During the exposure procedure, the control lines TRF, RES, and SEL are each maintained at 0 V, i.e. the switches 39, 45, 47 controlled hereby are open.

Before the actual readout, the cut-off switch 33 is first closed in a pre-charge step and is then opened again after the column line 17 has been set to a defined reference potential (here: ground potential). In parallel therewith, a voltage of 3.3 V is briefly applied to the control line RES to remove charge formed by leakage currents and/or by scattered light from the readout node 41, i.e. to delete the readout node 41. The readout node 41 is therefore set to a reference value, which is defined by the voltage supply 51, by means of the reset device 205. A voltage that corresponds to the charge at the deleted readout node 41 is thus adopted at the signal output 44 of the converter transistor 43.

In a next step (reading a reference value), a voltage of 3.3 V is applied to the control line SEL such that the selection switch 47 is closed. The switch 149A is additionally closed. A reference voltage signal V1 corresponding to the charge in the readout node 41 or to the reference value or the corresponding voltage value of the converter transistor 43 is hereby connected to the column line 17 via the selection switch 47 and is thus transferred to the capacitor 127. After the system has undergone transient oscillation, the selection switch 47 is opened again by a corresponding control signal and the capacitor 127 is simultaneously cut off from the column line 17 again by opening the switch 149A such that the reference voltage signal V1 is applied to the capacitor 127.

Subsequently, in a further pre-charge step, the column line 17 is again pre-charged to the defined reference potential by a brief closing of the cut-off switch 33. In parallel therewith, a voltage of 3.3 V is briefly applied to the control line TRF to briefly open the transfer gate 39 or to close the switch that is hereby formed such that the electrons generated in dependence on the exposure can flow from the light-sensitive detector element 15 to the readout node 41 (transfer step).

In a next step (reading a signal value), the selection switch 47 and the switch 149B are closed. An image voltage signal V2 corresponding to the generated charge in the readout node 41 or the corresponding voltage value of the converter transistor 43 is hereby switched to the column line 17 via the selection switch 47 and is thus transferred to the capacitor 133. After the system has undergone transient oscillation, the capacitor 133 is again cut off from the column line 17 by opening the switch 149B. The selection switch 47 is also opened and the pixel 11 is cut off from the column line 17 by applying 0 V to the control line SEL.

A voltage is now applied to the output of the amplifier 131 that corresponds to the difference of the voltage values stored in the capacitors 127, 133 and thus to the charge quantity generated in the light-sensitive detector element 15.

Finally, in a further step, a voltage of 3.3 V is briefly applied to the control lines RES and TRF to remove the charge from the readout node 41 and to remove any residual charge from the light-sensitive detector element 15 so that the next exposure procedure can again start with a completely "empty" pixel 11.

These steps are also carried out for the further pixels 11 connected to the respective column line 17.

Since charge located in the readout node 41 is thus first removed and the readout node 41 is reset to a reference value, the reference voltage signal V1 proportional to this reference value may be applied to the capacitor 127, whereupon the image voltage signal V2 proportional to the charge generated at the detector element 15 is formed at the capacitor 133. By subtracting the reference voltage signal V1 from the image voltage signal V2 or applying the differential voltage to the amplifier 131, any noise of the pixel 11 or of the image sensor 1 may be compensated such that the differential voltage, as the analog signal ultimately to be output, is as precisely proportional as possible to the charge actually generated at the detector element 15. The signal amplified by means of the amplifier 131 may then, for example, be applied to an analog-to-digital converter not shown in FIG. 2 in order to digitize the analog signal or the differential voltage generated by this analogous correlated double sampling.

There is, however, the problem here that errors may also occur during the digitizing of the difference signal, which the digitized value determined for the respective pixel 11 accordingly contains and which represents a deviation from the aimed-for digital value that is as precisely proportional as possible to the charge actually generated in the detector element. To approximately compensate this, dark or signal-less rows may indeed generally be provided and the analog signals determined in this respect may be digitized to be able to estimate the error occurring during the digitizing on the basis of a mean value. However, this mean value contains in particular statistical errors as well and a large number of dark rows are required to at least keep the statistical error as small as possible. Furthermore, due to the subtraction of a mean value, fluctuations of the errors of simultaneously read out pixels, for example pixels of a row, may not be taken into account, but the same averaged error has to be assumed for each pixel.

An imager 201 illustrated in FIG. 3 is provided to overcome this problem and to be able to read out an image sensor 1 such that a digital value corresponding as precisely as possible to the charge generated at the detector element 15 may be output for each pixel 11, in which digital value in particular any errors occurring due to the digitizing are minimized. In FIG. 3, this imager 201 is shown schematically with a representative pixel 11 that is part of an image sensor 661 having a plurality of pixels 11, in particular a CMOS image sensor (cf. FIGS. 1A and 1B). The pixels 11 or the shown pixel 11 of the image sensor 1 of the imager 201 are in this respect formed as described above with respect to FIG. 2, wherein a deviating forming of the pixels 11 may generally also be provided. For example, simpler embodiments of the pixel 11 or pixels 11 with an additional transistor, in particular an overflow capacitor, are possible.

To be able to digitize the reference voltage signal V1 output via the column line 17 and the image voltage signal V2, the imager 201 has a converter unit 207 having a first analog-to-digital converter 209 and a second analog-to-digital converter 211. In this respect, the reference voltage signal V1 held by the capacitor 127 may be applied to a signal input 213 of the first analog-to-digital converter 209 by closing a switch 149C that may be controlled via a control line S4 by means of the control device 153. The image voltage signal V2 applied to the capacitor 133 may also be applied to a signal input 213 of the second analog-to-digital converter 211 via a control line S5 by closing a switch 149D.

In this respect, the control device 153 may be configured to simultaneously close the switches 149C and 149D and thereby to simultaneously apply the reference voltage signal V1 and the image voltage signal V2 to the respective signal inputs 213 of the analog-to-digital converters 209 and 211. For this purpose, in particular the capacitor 127 forms a first memory 227 to hold the reference voltage signal V1 output via the column line 17 while the image voltage signal V2 is formed or the detector element 15 is read out. The capacitor 133 may also form a second memory 229 to hold the image voltage signal V2, in particular for a short time, before these two analog signals V1 and V2 are applied to the respective analog-to-digital converters 209 and 211. In this respect, the first memory 227 and the second memory 229 may form a first memory unit 223 of the imager 201. However, provision may generally also be made to conduct the image voltage signal V2 directly to the signal input 213 of the second analog-to-digital converter 211.

Since the image voltage signal V2 and the associated reference voltage signal V1 are simultaneously applied to the respective analog-to-digital converters 209 and 211, the reference voltage signal V1 may be converted into a digital reference signal value W1 by means of the first analog-to-digital converter 209 and the image voltage signal V2 may be simultaneously converted into a digital image signal value W2 by means of the second analog-to-digital converter 211. In this respect, the two analog-to-digital converters 209 and 211 may be operated in a synchronized manner such that ultimately the image signal value W2 and the reference signal value W1 may contain the same errors caused by the digitizing process.

To ultimately obtain a digital value corresponding to the charge generated at the detector element 15, the imager 201 has a computing unit 221 to which the reference signal value W1 and the image signal value W2 are transmitted. The computing unit 221 is in this respect configured to determine a pixel image value E, as a result by subtracting the digital reference signal value W1 from the digital image signal value W2, for each pixel 11 of the image sensor 1, here by way of example the pixel 11 shown, said pixel image value E being proportional to the charge generated at the detector element 15 of the respective pixel 11 during the exposure. Due to this subtraction, any noise of the image sensor 1 or of the pixel 11, which influences the reference voltage signal V1 and the image voltage signal V2 in the same manner, is taken into account and compensated in the pixel image value E, on the one hand, while, on the other hand, the errors of the digitizing process, which affect the reference signal value W1 and the image signal value W2 in the same manner due to the simultaneous conversion of the reference voltage signal V1 and the image voltage signal V2, may also be compensated. The pixel image value E may thus in particular be free of errors or uncertainties arising in the digitizing process.

FIG. 4 shows a schematic view of the converter unit 207 to illustrate a possibility of the synchronized operation of the two analog-to-digital converters 209 and 211 to be able to achieve a simultaneous conversion of the reference voltage signal V1 and the image voltage signal V2. In this respect, the converter unit 207 has a ramp generator 217 to generate a common voltage ramp for the first analog-to-digital converter 209 and for the second analog-to-digital converter 211. In this respect, the analog-to-digital converters 209 and 211 have a respective comparator 215 having a first input 216 and a second input 218, wherein the voltage ramp generated by the ramp generator 217 is applied to the respective first inputs 216 of the comparators 215. The second inputs 218 of the comparators 215 are, in contrast, connected to a respective one of the first memory 227 and the second memory 229 such that the reference voltage signal V1 may be applied to the second input 218 of the comparator 215 of the first analog-to-digital converter 209 by closing the switch 149C and the image voltage signal V2 may be applied to the second input 218 of the comparator 215 of the second analog-to-digital converter 211 by closing the switch 149D.

The converter unit 207 further has a first clock counter 219 for the first analog-to-digital converter 209 and a second clock counter 220 for the second analog-to-digital converter 211. Both clock counters 219 and 220 are connected to a common clock generator 222 that is in particular configured to generate a common start signal for the first clock counter 219 and the second clock counter 220 to be able to simultaneously start the clock counters 219 and 220. To determine the reference signal value W1 and the image signal value W2 based on the reference voltage signal V1 or the image voltage signal V2, the respective clock counters 219 and 220 may be stopped as soon as the voltage ramp generated by the ramp generator 217 reaches the voltage signal V1 or V2 applied to the respective analog-to-digital converter 209 or 211. A respective digital value may then be associated with the number of clock steps that the respective clock counter 219 or 220 performs between the start signal and the stop. This value may be output as a reference signal value W1 by the first clock counter 219 or as an image signal value W2 by the one second clock counter 220 (signal outputs not shown in FIG. 4). Since the clock counters 219 and 220 may in this respect be started by a common start signal and may thus be started simultaneously, a relative error between the number of clock steps of the clock counters 219 and 220 due to a different starting point in time may be prevented. In particular a jitter of the starting point in time may in this respect affect the digital reference signal value W1 and the digital image signal value W2 in the same manner as an error that may be compensated by the subsequent subtraction of these values. In addition, the clock generator 222 is also connected to the ramp generator 217 such that the start signal transmitted to the clock counters 219 and 220 may also be sent to the ramp generator 217 in order also to start the generation of the voltage ramp simultaneously with the clock counters 219 and 220.

The clock generator 222 may further act as a common clock for the first clock counter 219 and the second clock counter 220 to be able to operate the clock counters 219 and 220 with a synchronized cycle after the start. The occurrence of a relative error between the reference signal value W1 and the image signal value W2 due to clock counters 219 and 220 running at different speeds may thus also be prevented. The digitizing process for determining the reference signal value W1 and the image signal value W2 may thus in particular take place in a completely synchronized manner such that any errors affect the two digitized values in the same manner and may be compensated by the subsequent subtraction of the reference signal value W1 from the image signal value W2. An error generated by an offset of the voltage ramp also affects the reference signal value W1 and the image signal value W2 in the same manner due to the completely synchronized operation of the analog-to-digital converters 209 and 211 such that this error may likewise be eliminated in the course of this digital correlated double sampling by the subsequent subtraction of the digital reference signal value W1 from the digital image signal value W2.

While such a simultaneous digitizing of the reference voltage signal V1 and the image voltage signal V2 thus makes it possible to eliminate errors or uncertainties caused by the digitizing, the analog-to-digital converters 209 and 211 are generally unused during a readout of the reference voltage signal V1 and the image voltage signal V2 of a respective pixel 11. This offers the possibility of digitizing reference voltage signals V1 and image voltage signals V2 of further pixels 11 in the meantime and thereby reducing the readout time for reading out the image sensor 1, as will be explained in the following with reference to FIGS. 5A to 8. In these schematic representations, in particular the pixels 11A to 11F shown may generally be designed in the same manner as the pixels 11 illustrated in FIGS. 2 and 3 and may in particular be connectable to an associated column line 17 or 19 via respective selection switches 47. As likewise shown in FIGS. 2 and 3, the schematically shown memories 227 and 229 may in particular be configured as capacitors to hold the reference voltage signals V1 and image voltage signals V2 of the respective pixels 11. In addition, the switches 149A to 149P shown may generally be controllable by means of respective control lines, not shown in FIGS. 5A to 5C and 7, by means of the control device 153.

FIG. 5A shows a first pixel 11A, a second pixel 11B, and a third pixel 11C that are arranged in a column 13 and that are associated with a common column line 17. In contrast to FIG. 3, in addition to the first memory unit 223 having the first memory 227 and the second memory 229, a second memory unit 225 is formed here that likewise has a first memory 227 and a second memory 229. In this respect, the first memory unit 223 and the second memory unit 225 form a pair 231 of memory units 223 and 225. As FIG. 6 illustrates, this design of the imager 201 with two memory units 223 and 225 enables an accelerated readout of the image sensor 1 in that the time required for reading out or forming the reference voltage signal V1 and the image voltage signal V2 of one pixel 11 is used to simultaneously convert respective reference voltage signals V1 and image voltage signals V2 of another pixel 11 by means of the analog-to-digital converters 209 and 211.

For this purpose, the control device 153 may be configured, during a first time interval T1, to first reset the readout node 41 of the first pixel 11A by means of the reset device 205 in a step R and to couple the readout node 41 to the column line 17 and, by closing the switch 149B, to the memory 227 of the first memory unit 223 in a step K. The associated and thereby formed reference voltage signal of the pixel 11A may thereupon be held by the memory 227 in a step H1, for which purpose the switch 149B may be opened again after a settling of the system. Thereupon, further during the time interval T1, the detector element 15 of the first pixel 11A may be read out in a step A in that the pixel 11A is coupled to the column line 17 and, by closing the switch 149A, to the second memory 229 of the first memory unit 223. In a step H2, the image voltage signal V2 formed in this manner is held at the memory 229, for which purpose the switch 149A may be opened again.

During this forming of the reference voltage signal V1 and the image voltage signal V2 of the first pixel 11A, the reference voltage signal V1 and the image voltage signal V2 of the second pixel 11B, which may have been read into the memories 227 and 229 of the second memory unit 225 in a previous time interval that is not shown, are likewise digitized in the first time interval T1. For this purpose, during the first time interval T1, the first memory 227 of the second memory unit 225 is connected to the first analog-to-digital converter 209 by closing the switch 149F and the second memory 229 of the second memory unit 225 is connected to the second analog-to-digital converter 211 by closing the switch 149H (step V). Thereupon, the reference voltage signal V1 and the image voltage signal V2 of the second pixel 11B are simultaneously converted in a step W and the pixel image value E associated with the second pixel 11B is calculated in a step B by subtracting the determined reference signal value W1 from the determined image signal value W2.

The analog signals previously read in, the reference voltage signal V1 and the image voltage signal V2, of the first pixel 11A are digitized in a subsequent time interval T2. For this purpose, the first memory 227 of the first memory unit 223 is connected to the first analog-to-digital converter 209 by closing the switch 149G and the second memory 229 of the first memory unit 223 is connected to the second analog-to-digital converter 211 by closing the switch 149G (step V), the analog signals are converted (step W), and finally the pixel image value E associated with the first pixel 11A is calculated (step B). In addition thereto, during the second time interval T2, the reference voltage signal V1 and the image voltage signal V2 of the third pixel 11C are already formed in that the readout node 41 of said third pixel 11C is successively coupled to the column line 17 by closing the switch 149C or the switch 149D and the reference voltage signal V1 is read into the memory 227 and the image voltage signal V2 is read into the second memory 229 of the second memory unit 225 (steps R, K, H1, A, H2, as explained above).

The time required for forming respective analog signals V1 and V2 of a pixel 11 may thus be used to convert already previously formed analog signals V1 and V2 of a further pixel 11 such that the time required for reading out the image sensor 1 may be shortened. For this purpose, the two time intervals T1 and T2 may be repeated cyclically to successively read out the pixels 11 of the column 13 via the common column line 17. It is, however, generally also possible that further time intervals are interposed and/or further actions are performed in the time intervals T1 and T2.

While the pixels 11A, 11B, and 11C in the embodiment example of FIG. 5A are associated with a common column 13 and a common column line 17, it is also possible to provide the two analog-to-digital converters 209 and 211 of the converter unit 207 for pixels 11 that are arranged in a common column 13, but are associated with different column lines 17 and 19. This is illustrated in FIG. 5B, wherein the first pixel 11A and a fourth pixel 11D are associated with a first column line 17, while the second pixel 11B and the third pixel 11C are associated with a second column line 19. The column line 17 is in this respect associated with the first memory unit 223 and the column line 19 is associated with the second memory unit 225. In this respect, a pixel 11 associated with one of the column lines 17 or 19 may thus be alternately read out and its reference voltage signal V1 and its image voltage signal V2 may be formed, while previously formed reference voltage signals V1 and image voltage signals V2 of a pixel 11 associated with the other column line 19 or 17 are converted in the same time interval T1 or T2. For this purpose, the memory units 223 and 225 may be alternately connected to the analog-to-digital converters 209 and 211 or to the respective associated column line 17 or 19 such that the two column lines 17 and 19 share the converter unit 207. This makes it possible to limit the number of analog-to-digital converters 209 or 211 per column line 17 or 19 and so-to-say to minimize the expansion of the image sensor 201 and heat that arises through the operation of analog-to-digital converters 209 and 211 and that could lead to noise of the image sensor 1.

FIG. 5C further shows an embodiment in which the converter unit 207 having the analog-to-digital converters 209 and 211 is associated with pixels 11 that are arranged in two different columns 13 and 15. In this respect, the first memory unit 223 is associated with a first column line 17 and with pixels 11 arranged thereabove in a column 15, while the second memory unit 225 is associated via a second column line 19 with pixels 11 arranged in a column 13. The converter unit 207 or its two analog-to-digital converters 209 and 211 are thus shared by two columns 13 and 15 and reference voltage signals V1 and image voltage signals V2 of a pixel 11 of the one column 13 or 15 may be converted or digitized, while a reference voltage signal V1 and an image voltage signal V2 of a pixel 11 of the other column 15 or 13 are formed or read into the respective memory unit 223 or 225.

Due to this association of the converter unit 207 with pixels 11 of two columns 13 and 15, the number of analog-to-digital converters 209 and 211 per column 13 and 15 or per column line 17 and 19 may in particular also be minimized. However, this restriction of the number of analog-to-digital converters 209 and 211 per column 13 or 15 may result in an extended readout time of the image sensor 1 since only analog signals V1 and V2 of a pixel 11 from one of the columns 13 and 15 may be converted during a respective time interval T1 or T2, while no analog signals V1 and V2 of pixels 11 from the other column 15 or 13 are converted.

To minimize the readout time despite an association of the converter unit 207 or of the two analog-to-digital converters 209 and 211 with two columns 13 and 15 or two column lines 17 and 19, two further memory units 233 and 235 for storing respective reference voltage signals V1 and image voltage signals V2 are provided in the embodiment example illustrated in FIG. 7. In this respect, the first memory unit 223 and the second memory unit 225 are associated with a column 13 in which a first pixel 11A, a second pixel 11B, and a third pixel 11C are arranged that are selectively connectable to a column line 19. The third memory unit 233 and the fourth memory unit 235 are, in contrast, associated with a column 15 in which a fourth pixel 11D, a fifth pixel 11E, and a sixth pixel 11F are arranged that are selectively connectable to the memories 227 and 229 of a respective one of the third and fourth memory units 233 and 235 via a column line 17. A respective pair 231 of memory units 223 and 225 or 233 and 235 is thus associated with each column line 17 and 19 or each column 13 and 15.

A possibility of reading out such an image sensor 1 by means of this imager 201 having a pair 231 of memory units 223 and 225 or 233 and 235 per column 13 and 15 is in this respect illustrated in FIG. 8. In this respect, the reference voltage signal V1 and the image voltage signal V2 of the first pixel 11A, which is arranged in the column 13 and is associated with the column line 19, are formed during a first time interval T1. For this purpose, after the resetting of the readout node 41, the pixel 11A may be connected to the first memory 227 of the first memory unit 223 by closing a switch 149F and the reference voltage signal V1 formed may be held in the memory 227 (steps R, K, and H1). Thereupon, the pixel 11A may be connected to the second memory 229 of the first memory unit 223 via the column line 19 by closing a switch 149B and the detector element 15 may be read out to form an image voltage signal V2 and to hold it in the second memory 229 of the first memory unit 223 (steps A and H2).

The reference voltage signal V1 and the image voltage signal V2 of the second pixel 11B, which were read into the memories 227 and 229 of the second memory unit 225 in a previous time interval not shown, may be converted at the same time or likewise during the first time interval T1. For this purpose, the first memory 227 of the second memory unit 225 may be connected to the signal input 213 of the first analog-to-digital converter 209 by closing a switch 149O and the second memory 229 of the second memory unit 225 may simultaneously be connected to the signal input 213 of the second analog-to-digital converter 211 by closing a switch 149J (step V), whereupon the image voltage signal V2 and the reference voltage signal V1 of the second pixel 11B are simultaneously converted (step W) and the pixel image value E is calculated (step B).

In the first time interval T1, similarly to in the embodiment example of FIG. 5A, the analog signals V1 and V2 of the first pixel 11A of the column 13 are thus formed, while the analog signals of the second pixel 11B arranged in the same column 13 are converted in the same time interval T1. In addition thereto, the first time interval T1 is, however, also used here to form the reference voltage signal V1 and the image voltage signal V2 of the fourth pixel 11D and to read them into the third memory unit 223 in parallel with the forming and reading of the reference voltage signal V1 and the image voltage signal V2 of the first pixel 11A into the first memory unit 233. For this purpose, the column line 17 may be successively connected to the first memory 227 of the third memory unit 233 or to the second memory 229 of the third memory unit 233 by closing switches 149G and 149C, and the steps R, K, H1, A, and H2 may be performed for the fourth pixel 11D.

Furthermore, in the first time interval T1, after the digitizing process for the second pixel 11B has been completed, the reference voltage signal V1 and the image voltage signal V2 of the fifth pixel 11E from the column 15 are also converted. For this purpose, these analog signals V1 and V2 of the fifth pixel 11E may have been read in in the memories 227 and 229 of the fourth memory unit 235 in the already mentioned preceding time interval by connecting the fifth pixel 11E to the column line 17 and by closing respective switches 149H and 149D (steps R, K, H1, A, H2). By simultaneously connecting these memories 227 and 229 of the fourth memory unit 235 to the analog-to-digital converters 209 and 211, for which purpose the switches 149P and 149M may be closed by means of the control device 153, the digital values associated with the fifth pixel 11E, the image signal value W2 and the reference signal value W1, may also be formed and the pixel image value E of the fifth pixel 11E may be determined in the first time interval T1 (steps V, W, B).

The first time interval T1 is thus used to read in the analog signals of two pixels 11A and 11D, which are arranged in two different columns 13 and 15, and to successively convert previously read-in analog signals V1 and V2 from two pixels 11B and 11E, which are likewise arranged in the two different columns 13 and 15, during the same time interval T1. Despite the association of the converter unit 207 having a single first analog-to-digital converter 209 and a single second analog-to-digital converter 211 with pixels 11 of two columns 13 and 15, analog signals V1 and V2 of a respective pixel 11 from both columns 13 and 15 may consequently be converted during the first time interval T1 such that the readout of the image sensor 1 may take place in an accelerated manner and analog signals V1 and V2 of a complete row 12 of pixels 11 may, for example, be digitized during the first time interval T1.

This accelerated readout is made possible in that the digitizing processes may be performed in a shorter time compared to the readout of the analog signals V1 and V2, in particular of the image voltage signals V2. In particular the forming of the image voltage signals V2 may in this respect determine the time required for reading out the image sensor 1 since, for this purpose, the electric charge generated at the detector element 11 during an exposure has to flow off completely and has to be transferred into a voltage at the respective memory 229. Thus, the time for reading in analog signals V1 and V2 may be used to successively convert previously read-in and stored analog signals V1 and V2 of a plurality of further pixels 11 in the process.

Accordingly, in a second time interval T2 following the first time interval T1, the analog signals of the first pixel 11A and the fourth pixel 11D read in in the first time interval T1 may be successively converted and the pixel image values E of the first pixel 11A and the fourth pixel 11D may be determined by subtracting the respective reference signal value W1 from the respective image signal value W2. In addition, during the second time interval T2, a third pixel 11C and a sixth pixel 11F of the columns 13 and 15 respectively may be read out and the respective reference voltage signals V1 and image voltage signals V2 may be read into the second memory unit 225 or the fourth memory unit 235. The first time interval T1 and the second time interval T2 may be repeated cyclically to read out the image sensor 1 row-wise in this manner.

It is generally also possible to associate a plurality of pairs 231 of memory units 223 and 225 or 233 and 235 with a column 13 or 15 and/or a column line 17 or 19. In a time interval T1 or T2, two analog signals V1 and V2 of pixels 11 of a column 13 or 15 may, for example, be formed and previously formed analog signals V1 and V2 of pixels 11 of the same column 13 or 15 may be converted. Furthermore, provision may also be made in some embodiments to associate a converter unit 207 with more than two pairs 231 of memory units 223 and 225 or 233 and 235, for example three pairs 231 or four pairs 231, and, during a time interval T1 or T2, analog signals V1 and V2 from three pixels 11 or from four pixels 11 may, for example, be read into respective memory units and the previously read-in analog signals V1 and V2 from a further three pixels 11 or four pixels 11 may be converted. If necessary, the time intervals T1 and T2 may also be slightly extended compared to the time required for reading out and storing reference voltage signals V1 and image voltage signals V2 in order to be able to successively perform the desired number of digitizing processes during the time interval T1 or T2.

The imager 201 disclosed herein thus makes it possible to read out an image sensor 1 in a fast and efficient manner and in this respect to compensate errors caused by the digitizing of the analog signals of the pixels 11 as fully as possible. Digital pixel image values E corresponding precisely to the charge actually generated at the respective detector elements 15 of the pixels 11 may thereby be obtained for all the pixels 11 in order to enable a precise digitizing of an image generated by means of a camera comprising the image sensor 1 or the imager 201.

REFERENCE NUMERAL LIST 1 image sensor
3 row addressing logic
4 column amplifier
6 row selection line
7 separation line
11, 11A, 11B, 11F pixel
12 row
13 first column
14 second column
15 light-sensitive detector element
17 first column line
19 second column line
31 power source
33 cut-off switch
39 transfer gate
39 readout node
43 converter transistor
44 signal output of the converter transistor
45 reset switch
47 selection switch
51 supply voltage
52 upper column line
53 lower column line
55 upper block
57 lower block
113 column readout circuit
115 pre-charge circuit
127 reference value capacitor
131 amplifier
133 signal value capacitor 135 positive input
137 negative input
149A, 149B, . . . , 149P switch
153 control device
201 imager
205 reset device
207 converter unit
209 first analog-to-digital converter
211 second analog-to-digital converter
213 signal input
215 comparator
216 first input of the comparator
217 ramp generator
218 second input of the comparator
219 first clock counter
220 second clock counter
221 computing unit
222 dock generator
223 first memory unit
225 second memory unit
227 first memory
229 second memory
231 pair of memory units
233 third memory unit
235 fourth memory unit
A reading out
B calculating
E pixel image value
H1, H2 holding
K coupling
R resetting
S1, S2, . . . , S5 control line
T1 first time interval
T2 second time interval
V connecting
V1 reference voltage signal
V2 image voltage signal
W converting
W1 reference signal value
W2 image signal value

The invention claimed is:

1. An imager comprising an image sensor for electronic cameras that has a plurality of pixels arranged in rows and columns, wherein at least one column line is associated with a plurality of pixels of a column, and wherein each pixel comprises a light-sensitive detector element, which is configured to generate electric charge from light incident during an exposure, and a reset device that is configured to reset charge present in the pixel to a reference value,
wherein the imager has a control device that is configured to couple a respective pixel to the associated column line in order to successively output, via the associated column line, a reference voltage signal that corresponds to the reference value and an image voltage signal that corresponds to the electric charge generated during the exposure,
wherein the imager has at least one converter unit that has a first analog-to-digital converter and a second analog-to-digital converter, wherein the control device is configured to apply the reference voltage signal of the respective pixel to a signal input of the first analog-to-digital converter for conversion into a digital reference signal value and to simultaneously apply the image voltage signal of the respective pixel to a signal input of the second analog-to-digital converter for conversion into a digital image signal value.

2. An imager in accordance with claim 1, wherein the converter unit is configured to convert the reference voltage signal into the digital reference signal value using the first analog-to-digital converter and simultaneously convert the image voltage signal into the digital image signal value using the second analog-to-digital converter.

3. An imager in accordance with claim 1, wherein the converter unit comprises a ramp generator and is configured to generate a common voltage ramp for the first analog-to-digital converter and for the second analog-to-digital converter for simultaneously converting the reference voltage signal and the image voltage signal.

4. An imager in accordance with claim 1, wherein the first analog-to-digital converter has a first clock counter and the second analog-to-digital converter has a second clock counter, wherein the converter unit is configured to synchronize the clock counters of the first analog-to-digital converter and the second analog-to-digital converter.

5. An imager in accordance with claim 1, wherein the imager comprises a computing unit that is configured to determine a pixel image value for each pixel by subtracting the digital reference signal value from the digital image signal value.

6. An imager in accordance with claim 1, wherein the image sensor has at least one memory unit;
wherein the memory unit comprises a first memory for holding the reference voltage signal; or
wherein the memory unit comprises a first memory for holding the reference voltage wherein the memory unit comprises a first memory for holding the reference voltage signal and a second memory for holding the image voltage signal.

7. An imager in accordance with claim 1,
wherein the image sensor has at least a first and a second memory unit, wherein each of the first and second memory units comprises a first memory for holding the reference voltage signal and a second memory for holding the image voltage signal,
wherein the control device is configured to selectively connect the signal input of the first analog-to-digital converter to the first memory of the first memory unit and simultaneously connect the signal input of the second analog-to-digital converter to the second memory of the first memory unit, or to connect the signal input of the first analog-to-digital converter to the first memory of the second memory unit and simultaneously connect the signal input of the second analog-to-digital converter to the second memory of the second memory unit.

8. An imager in accordance with claim 7,
wherein the first and second memory units are associated with the same column of pixels or with two different columns of pixels.

9. An imager in accordance with claim 7,
Wherein the image sensor has one or more pairs of first and second memory units for each column of pixels, wherein the image sensor has a respective pair of first and second analog-to-digital converters for one pair or for two pairs of first and second memory units.

10. An imager in accordance with claim 7, wherein the control device is configured,
during a first time interval, to read the reference voltage signal and the image voltage signal of a first pixel into the first memory unit, and to apply the reference voltage signal and the image voltage signal of a second pixel from the second memory unit to the signal inputs of the first and second analog-to-digital converter and to simultaneously convert the reference voltage signal and the image voltage signal of the second pixel into the reference signal value and the image signal value in the first and second analog-to-digital converter; and, during a second time interval, to read the reference voltage signal and the image voltage signal of a third pixel into the second memory unit, and to apply the reference voltage signal and the image voltage signal of the first pixel from the first memory unit to the signal inputs of the first and second analog-to-digital converter and to simultaneously convert the reference voltage signal and the image voltage signal of the first pixel into the reference signal value and the image signal value in the first and second analog-to-digital converter.

11. An imager in accordance with claim 10,
wherein the first pixel, the second pixel, and the third pixel belong to the same column of pixels and are associated with the same column line; or
wherein the first pixel, the second pixel, and the third pixel belong to the same column of wherein the first pixel, the second pixel, and the third pixel belong to the same column of pixels, and wherein the first pixel and the second pixel are associated with different column lines; or
wherein the first pixel and the second pixel belong to different columns of pixels.

12. An imager in accordance with claim 10, wherein the first memory unit and the second memory unit are associated with a single column line of a respective column, wherein the control device is configured,
during the first time interval, to couple the first memory unit to the single column line and to decouple the second memory unit from the single column line; and,
during the second time interval, to couple the second memory unit to the single column line and to decouple the first memory unit from the single column line.

13. An imager in accordance with claim 10,
wherein the first memory unit and the second memory unit are associated with two different column lines, wherein the control device is configured,
during the first time interval, to couple the first memory unit to a first one of the two different column lines and to decouple the second memory unit from a second one of the two different column lines; and,
during the second time interval, to couple the second memory unit to the second one of the two different column lines and to decouple the first memory unit from the first one of the two different column lines.

14. An imager in accordance with claim 10,
wherein the control device is configured,
during the first time interval, to decouple the first memory unit from the first and second analog-to-digital converter and to couple the second memory unit to the first and second analog-to-digital converter; and,
during the second time interval, to couple the first memory unit to the first and second analog-to-digital converter and to decouple the second memory unit from the first and second analog-to-digital converter.

15. An imager in accordance with claim 1, wherein each column of pixels has a plurality of column lines wherein, for each column of pixels, the pixels of the column are associated with different ones of the plurality of column lines.

16. An imager in accordance with claim 1, wherein the respective pixel further comprises:
a readout node;
a transfer gate to selectively couple the light-sensitive detector element to the readout node;
a converter transistor to convert charge present at the readout node into a voltage signal; and
a selection switch that is connected to a signal output of the converter transistor to selectively couple the signal output of the converter transistor to the associated column line.

17. A method of reading out an image sensor for electronic cameras that has a plurality of pixels arranged in rows and columns, wherein at least one column line is associated with a plurality of pixels of a column, and wherein each pixel comprises a light-sensitive detector element, which is configured to generate electric charge from light incident during an exposure, and a reset device that is configured to reset charge present in the pixel to a reference value, said method comprising the following steps:
resetting the charge present in a pixel;
coupling the pixel to the associated column line and outputting a reference voltage signal corresponding to the reference value;
coupling the pixel to the associated column line and outputting an image voltage signal corresponding to the charge generated; and
applying the reference voltage signal of the pixel to a signal input of a first analog-to-digital converter and simultaneously applying the image voltage signal of the pixel to a signal input of a second analog-to-digital converter.

18. A method in accordance with claim 17,
comprising the step:
simultaneously converting the reference voltage signal using the first analog-to-digital converter into a digital reference signal value and converting the image voltage signal using the second analog-to-digital converter into a digital image signal value.

19. A method in accordance with claim 17,
comprising the step:
generating a common voltage ramp for the first analog-to-digital converter and for the second analog-to-digital converter.

20. A method in accordance with claim 17,
Comprising the step:
forming a pixel image value by subtracting the reference signal value from the image signal value.

21. A method in accordance with claim 17,
Wherein the reference voltage signal is held in a memory during the generation of the image voltage signal.

22. A method in accordance with claim 17, wherein, during a first time interval, the reference voltage signal and the image voltage signal of a first pixel are read into a first memory unit, wherein, during the first time interval, the reference voltage signal held in a second memory unit and the image voltage signal of a second pixel held in the second memory unit are applied to the signal inputs of the first analog-to-digital converter and the second analog-to-digital converter and are simultaneously converted in the first and second analog-to-digital converter,
wherein, during a second time interval, the reference voltage signal and the image voltage signal of the first pixel are applied to the signal inputs of the first analog-to-digital converter and the second analog-to-digital converter and are simultaneously converted in the first and second analog-to-digital converter, wherein, during the second time interval, the reference voltage signal and the image voltage signal of a third pixel are read into the second memory unit.

23. A method in accordance with claim 22, wherein, during the first time interval, the reference voltage signal and the image voltage signal of a fourth pixel are read into a third memory unit, and the reference voltage signal of a fifth pixel held in a fourth memory unit and the image voltage signal of the fifth pixel held in the fourth memory unit are applied to the signal inputs of the first analog-to-digital converter and the second analog-to-digital converter and are simultaneously converted in the first and second analog-to-digital converter, and wherein, during the second time interval, the reference voltage signal and the image voltage signal of the fourth pixel are applied to the signal inputs of the first analog-to-digital converter and the second analog-to-digital converter and are simultaneously converted in the first and second analog-to-digital converter and the reference voltage signal and the image voltage signal of a sixth pixel are read into the fourth memory unit.

24. A method in accordance with claim 17, wherein the reference voltage signal is held in a first memory of a memory unit and the image voltage signal is held in a second memory of the memory unit while the image voltage signal and the reference voltage signal are applied to the respective signal inputs of the analog-to-digital converters.

* * * * *